(12) United States Patent
Retterath

(10) Patent No.: US 12,152,354 B2
(45) Date of Patent: Nov. 26, 2024

(54) ANISOTROPIC RETROREFLECTIVE MESH FOR LONGITUDINAL PAVEMENT MARKING ARTICLES AND METHODS

(71) Applicant: Vergence Automation, Inc., Excelsior, MN (US)

(72) Inventor: James E. Retterath, Excelsior, MN (US)

(73) Assignee: Vergence Automation, Inc., Excelsior, MN (US)

( * ) Notice: Subject to any disclaimer, the term of this patent is extended or adjusted under 35 U.S.C. 154(b) by 535 days.

(21) Appl. No.: 17/544,600

(22) Filed: Dec. 7, 2021

(65) Prior Publication Data
US 2022/0178094 A1    Jun. 9, 2022

Related U.S. Application Data

(60) Provisional application No. 63/122,828, filed on Dec. 8, 2020.

(51) Int. Cl.
*G02B 5/124* (2006.01)
*E01F 9/524* (2016.01)
*E01C 23/18* (2006.01)

(52) U.S. Cl.
CPC .............. *E01F 9/524* (2016.02); *G02B 5/124* (2013.01); *E01C 23/185* (2013.01)

(58) Field of Classification Search
CPC .......... E01F 9/524; E01F 9/512; G02B 5/124; E01C 23/185
See application file for complete search history.

(56) References Cited

U.S. PATENT DOCUMENTS

| | | | |
|---|---|---|---|
| 3,541,606 A | 11/1970 | Heenan et al. |
| 3,712,706 A | 1/1973 | Stamm |
| 3,810,804 A | 5/1974 | Rowland |
| 3,924,929 A | 12/1975 | Holmen et al. |
| 3,946,130 A | 3/1976 | Tung et al. |
| 3,975,083 A | 8/1976 | Rowland |
| 4,025,159 A | 5/1977 | McGrath |
| 4,123,140 A | 10/1978 | Ryan et al. |
| 4,202,600 A | 5/1980 | Burke et al. |
| 4,243,618 A | 1/1981 | Van Arnam |
| 4,349,598 A | 9/1982 | White |
| 4,576,850 A | 3/1986 | Martens |
| 4,588,258 A | 5/1986 | Hoopman |
| 4,712,868 A | 12/1987 | Tung et al. |
| 4,775,219 A | 10/1988 | Appeldorn et al. |
| 4,895,428 A | 1/1990 | Nelson et al. |
| 5,450,235 A | 9/1995 | Smith et al. |
| 5,691,846 A | 11/1997 | Benson, Jr. et al. |

(Continued)

FOREIGN PATENT DOCUMENTS

| | | |
|---|---|---|
| KR | 20080066063 | 7/2008 |
| KR | 20100009432 | 1/2010 |

*Primary Examiner* — Euncha P Cherry
(74) *Attorney, Agent, or Firm* — Barnes & Thornburg LLP

(57) ABSTRACT

In various embodiments, the present disclosure provides for reflective materials, articles and methods incorporating a mesh arrangement of multiple, discrete retroreflective canted cube corner reflectors each having generally flat incident surfaces and high transparency, with a geometry and a refractive index ratio sufficiently high enough to produce a high degree of total internal reflection (TIR) that results in anisotropic retroreflectivity.

17 Claims, 19 Drawing Sheets

(56) References Cited

U.S. PATENT DOCUMENTS

| | | | |
|---|---|---|---|
| 6,127,020 | A | 10/2000 | Bacon, Jr. et al. |
| 6,172,810 | B1 | 1/2001 | Fleming et al. |
| 6,287,670 | B1* | 9/2001 | Benson .................. G02B 5/124 |
| | | | 428/209 |
| 6,287,680 | B1 | 9/2001 | Sasaki et al. |
| 6,470,610 | B1 | 10/2002 | Northey |
| 6,540,367 | B1 | 4/2003 | Benson et al. |
| 6,883,921 | B2 | 4/2005 | Mimura et al. |
| 6,967,053 | B1 | 11/2005 | Mullen et al. |
| 7,045,475 | B2 | 5/2006 | Senturk et al. |
| 7,156,527 | B2 | 1/2007 | Smith |
| 7,168,815 | B2 | 1/2007 | Shipman et al. |
| 7,784,952 | B2 | 8/2010 | Yukawa et al. |
| 8,469,578 | B2 | 6/2013 | Cornelissen et al. |
| 8,496,339 | B2 | 7/2013 | Nakajima |
| 8,591,044 | B2 | 11/2013 | Budd et al. |
| 8,651,720 | B2 | 2/2014 | Sherman et al. |
| 8,783,879 | B2 | 7/2014 | Smith et al. |
| 9,182,525 | B2 | 11/2015 | Kim et al. |
| 9,575,225 | B2 | 2/2017 | Kim |
| 9,651,721 | B2 | 5/2017 | Chapman |
| 9,670,091 | B2 | 6/2017 | Ryu et al. |
| 9,703,023 | B2 | 7/2017 | Smith et al. |
| 9,790,372 | B1 | 10/2017 | Greer et al. |
| 9,910,194 | B2 | 3/2018 | Free et al. |
| 9,964,676 | B2 | 5/2018 | Nagahama et al. |
| 9,971,074 | B2 | 5/2018 | Chatterjee et al. |
| 2003/0123931 | A1 | 7/2003 | Khieu et al. |
| 2006/0087735 | A1 | 4/2006 | Nilsen et al. |
| 2016/0011346 | A1 | 1/2016 | Vasylyev |
| 2016/0209559 | A1 | 7/2016 | McCarthy et al. |
| 2022/0178094 | A1 | 6/2022 | Retterath |
| 2023/0400612 | A1 | 12/2023 | Retterath |

* cited by examiner

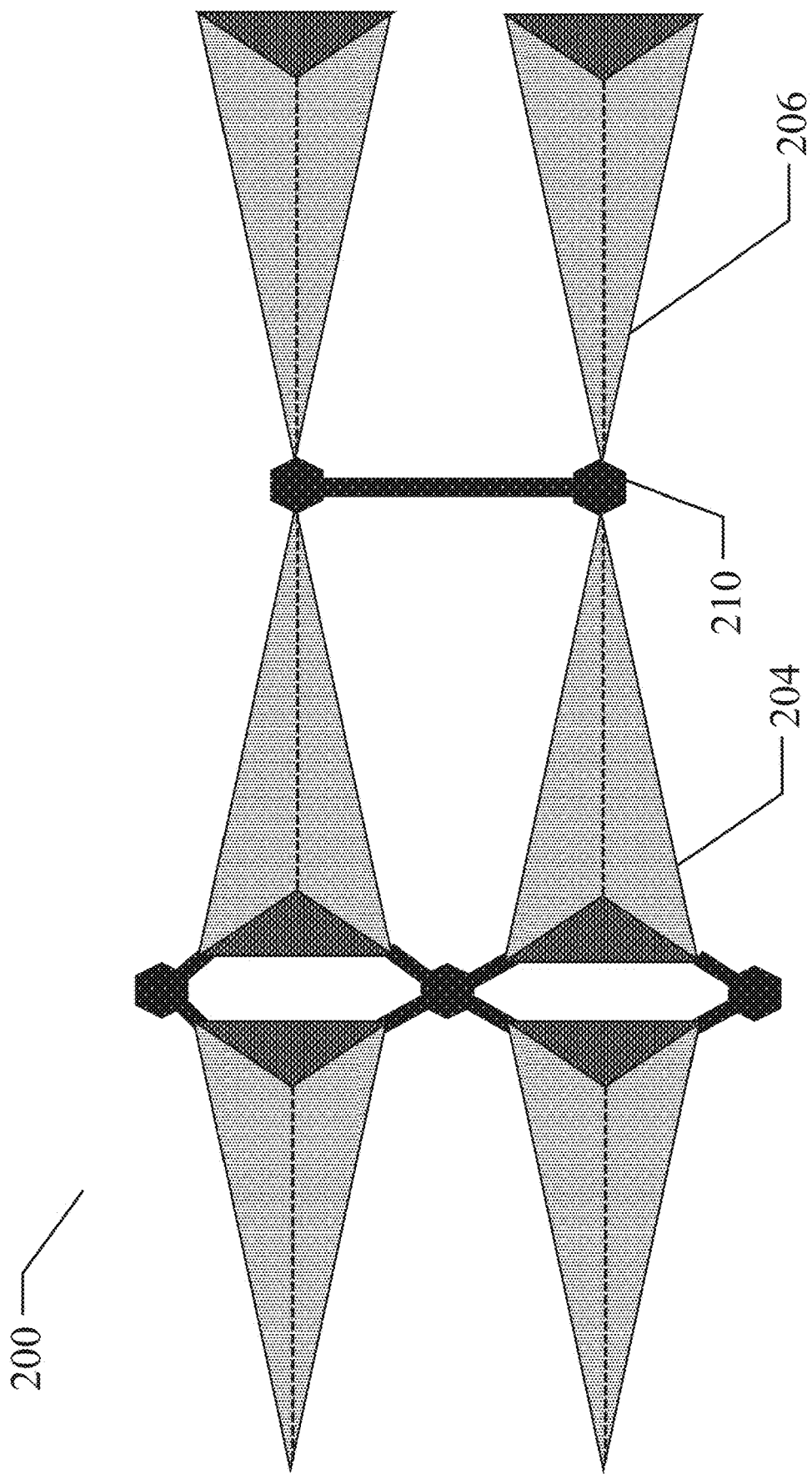

ANISOTROPIC RETROREFLECTIVE MESH FOR LONGITUDINAL PAVEMENT MARKING ARTICLES AND METHODS

FIELD OF THE INVENTION

The present disclosure relates to roadway and automotive materials and articles that are reflective, such as reflective road markers. More particularly, the present disclosure relates to reflective materials, articles and methods for longitudinal pavement marking incorporating a mesh arrangement of multiple, discrete retroreflective canted cube corner reflectors each having generally flat incident surfaces and high transparency, with a geometry and a refractive index ratio sufficiently high enough to produce a high degree of total internal reflection (TIR) that results in anisotropic retroreflectivity.

BACKGROUND OF THE INVENTION

Retroreflectivity refers to a physical property of reflecting light back in an incident direction of the light. Reflective materials and articles having high retroreflectivity properties are used for road signs and roadway markings to enhance visibility while promoting driver safety. Retroreflectivity may be affected by surface characteristics, composition of materials, refractive index, and/or transparency of the materials. Retroreflective materials and articles like road signs and pavement markings have generally been developed based on retroreflective elements associated with the materials or articles.

Because of the differences in where and how they are used, the techniques for enhancing retroreflectivity for roadway materials and articles have differed for pavement markings versus road signs. For pavement markings, retroreflectivity is typically enhanced by embedding discrete retroreflective elements in a binder or adhesive material such that the pavement markings exhibit specular reflectance. The most common retroreflective elements used for pavement marking are beads or similar microsphere elements having a different index of refraction than the binder or adhesive material. For road signs, retroreflectivity is typically enhanced by using retroreflective sheeting with contiguous retroreflective elements that utilize the phenomenon of total internal reflection (TIR). The most common types of retroreflective sheeting consist of a layer of transparent material with a smooth front surface and a rear surface having a pattern of retroreflective elements or geometric features, such as a series of trihedral-shaped features referred to as cube corners because of the internal corner that is formed by the three mutually perpendicular flat surfaces of the trihedral structure.

Pavement markings that rely on specular reflection and are thus considered non-TIR generally include microspheres as the retroreflective elements and are produced in prefabricated form like reflective tapes or are produced in situ by applying binder materials to roadways and applying a layer of one or more microsphere types to the unset binder layer. The binder typically consists of paint, thermoplastic material, thermoset material, or other curable material. Examples of reflective pavement marking constructions utilizing microsphere beads as the retroreflective elements are disclosed in U.S. Pat. No. 3,946,130 (Tung), U.S. Pat. No. 7,045,475 (Senturk), U.S. Pat. No. 7,168,815 (Shipman), U.S. Pat. No. 7,784,952 (Yukawa), U.S. Pat. No. 8,591,044 (Budd), U.S. Pat. No. 9,670,091 (Ryu), U.S. Pat. No. 9,790,372 (Greer), and Korean Appl. Nos. 10-2008-0066063 and 10-2010-0009432.

Multi-layer pavement markings with microspheres suffer from several shortcomings that inhibit their use for machine vision systems utilized in vehicle safety systems. First, microspheres utilize specular reflectance at the microsphere-to-binder layer, which results in lower levels of reflectivity due to loss. Second, microspheres rapidly lose adhesion with the binder layer, thus dramatically lowering the reflectivity of the article very early in the life cycle. Third, different types of microspheres must be utilized for improved performance in both wet and dry conditions. Because wet-type microspheres do not reflect well in dry conditions and because dry-type microspheres do not reflect well in wet conditions, reflective efficiency of the overall article is reduced. Furthermore, the non-flat incident surface of the produced materials makes them less durable and produces inconsistent performance for wet/dry surface conditions.

Reflective sign sheeting has been utilizing cube corner construction in flexible materials to enhance sign sheeting retroreflectivity. The flexible materials typically utilize a cube corner construction that utilizes TIR to enhance the article reflective properties at low entrance angles, or those angles that are near-parallel to and in the opposite direction of the normal vector for the sign. Illustrative examples of cube corner type retroreflectors that are used in reflective sheeting are disclosed in U.S. Pat. No. 3,541,606 (Heenan), U.S. Pat. No. 3,712,706 (Stamm), U.S. Pat. No. 3,810,804 (Rowland), U.S. Pat. No. 4,025,159 (McGrath), U.S. Pat. No. 4,202,600 (Burke), U.S. Pat. No. 4,243,618 (Van Arnam), U.S. Pat. No. 4,349,598 (White), U.S. Pat. No. 4,576,850 (Martens), U.S. Pat. No. 4,588,258 (Hoopman), U.S. Pat. No. 4,775,219 (Appeldorn), U.S. Pat. No. 4,895,428 (Nelson), U.S. Pat. No. 5,450,235 (Smith), U.S. Pat. No. 5,691,846 (Benson), U.S. Pat. No. 6,470,610 (Northey), U.S. Pat. No. 6,540,367 (Benson), U.S. Pat. No. 7,156,527 (Smith), and U.S. Pat. No. 9,703,023 (Smith).

Light beams or waves entering the incident surface of a retroreflective sheeting or material are measured according to an entrance angle that, like an angle of incidence, is determined relative to a normal of the surface where the beam or wave enters the surface. Depending upon the entrance angle and the differences in the indices of refraction, the light beams may experience TIR within the medium of the retroreflective sheeting or material and are then completely reflected internally within the medium and back out in the direction from which the light beams came. Ideally, such retroreflective sheeting or material should be able to retroreflect light beams entering the front surface not only at low entrance angles that are near zero (i.e., in a direction near normal to the sheeting), but also at high entrance angles. Because the ability to internally reflect light at high entrance angles is dependent on the difference between the indices of refraction of the material forming the retroreflective elements and the material that interfaces with the back surface, many versions of retroreflective sheeting provide an air space behind the retroreflective elements in order to maximize this difference. For example, U.S. Pat. No. 4,123,140 (Ryan) describes reflecting sheeting having a wide response angle, which is accomplished by positioning spaced-apart cavities along one face, and also producing retroreflectivity by positioning light-reflecting beads along the other, opposite side of the sheeting. However, even when such an air space is used, light entering the retroreflective elements beyond a certain critical angle will leak out as partially refracted light, thereby reducing the retroreflectivity of the sheeting. Air spaces behind the reflective base material can also cause problems with durability and with the infusion of foreign, life-reducing materials.

Another solution that has been proposed for improving retroreflectivity is a series of parallel, specularly-reflective ledges arranged along a reflective backing, and coated in a high index of refraction material, as shown in U.S. Publ. Appl. No. 2016-0011346 A1 (Vasylyev). The repeating structures need not be ledges, and could instead be, for example, prismatic components as described in U.S. Pat. No. 3,975,083 (Rowland), or indeed some combination thereof as described in U.S. Pat. No. 9,182,525 (Kim). Similarly, another approach to increasing retroreflective output of a sheet material is described in U.S. Pat. No. 3,924,929 (Holmen) by using cube-corner retroreflecting units and septa embossed on one surface, the septa being disposed to divide the surface into a multiplicity of separately sealable cells each holding several units therein. These materials are suitable only for very specific applications, as light incident from any direction except a very narrow cone can be "trapped" in the ladder style structure and scattered in any of a variety of directions that do not promote retroreflectivity.

To overcome these shortcomings, retroreflective sheeting has been developed that employs, in lieu of air spaces, a solid backing layer having an index of refraction that is lower than the index of refraction of the material used to form the retroreflective elements. While such sheeting is structurally sounder and stronger than comparable sheeting employing air spaces behind the retroreflective elements, the ability of such sheeting to provide TIR for a broad range of entrance angles is significantly less than that of air-backed articles because the difference in the index of refraction between the material forming the retroreflective elements and the material forming the solid backing layer is less. For example, if the retroreflective elements are cube corners formed from polycarbonate having an index of refraction $n=1.59$, and the solid backing material is cryolite having an index of refraction of $n=1.32$, the difference between the indices of refraction is $1.59-1.32=0.27$. By contrast, when the backing layer is formed from air having an index of refraction $n=1.00$, the difference between the indices of refraction is $1.59-1.00=0.59$ which is more than twice as much as 0.27. Unfortunately, high entrance angle performance has been difficult to achieve due to the requirement that sign sheeting be produced in flexible form and, as a result, requiring materials with a low index of refraction.

Another approach to producing retroreflective sheeting uses an open-faced cube-corner surfaces in which the cube-corner features are on the front or incident surface instead of the rear surface as in conventional cube corner sheeting and are formed of a substantially rigid material to keep the cube-corner surfaces from flexing. Instead of using the TIR phenomenon to enhance retroreflectivity, the open-face cube corner surfaces rely on specular reflection similar to the microsphere beads used in pavement markings.

Cube-corner sheeting typically employs a multitude of rigid, interconnected, cube-corner elements to retroreflect incident light. Due in part to their interconnected nature, the shape of the cube-corner elements can become distorted during flexing, resulting in a loss of retroreflectivity. To provide for some degree of flexibility, the open-faced cube corner features can be cut or formed into flakes or chips and mixed into various coatings or resins. Examples of retroreflective sheeting with substantially rigid open-faced cube-corner elements that rely on specular reflection instead of TIR are disclosed in U.S. Pat. No. 6,967,053 (Mullen).

Similar examples of retroreflective sheeting with open-faced cube-corner elements that rely on specular reflection instead of TIR are disclosed in U.S. Pat. No. 5,450.235 (Smith), U.S. Pat. No. 6,155,689 (Smith) and U.S. Pat. No. 6,287,680 (Benson), and U.S. Publ. Appl. No. 2006-0087735A1 (Nilsen).

In some versions, the retroreflective components can extend out of the sheeting material itself. For example, as described in U.S. Pat. No. 4,712,868 (Tung), reflectance of light coming from high incidence angles is improved by extending retroreflective articles in the direction of travel, and by expanding the retroreflective article outward from the base sheet. This structure is formed by slitting the sheet and then expanding or stretching it, causing a three-dimensional structure for better reflectance. Although this technique improves incidence-angle reflection, such three-dimensional structures are susceptible to wear and tear and are generally not acceptable for use on a roadway or other surface subject to mechanical impact or abrasion. Conversely, features can be made that are indented into a sheet to provide retroreflectivity, as described in U.S. Pat. No. 8,469,578 (Cornelissen) which teaches features formed by including materials that shrink to release parallel surfaces that exhibit TIR.

Still another approach to increase the entrance angle at which a retroreflector exhibits some degree of retroreflectivity is to apply a reflective metallic layer such as vacuum-deposited aluminum to the back surface. In such a structure, when light enters the cube corners, for example, it exhibits specular reflection off of the metallic layer when it reaches the faces of the cube corners, and is retroreflected back toward its source, even when entering at angles beyond the critical angle for TIR in an air-backed structure. In addition to increasing the entrance angle at which the retroreflector exhibits some degree of retroreflectivity, metallization provides a seal over the back surface of the retroreflective elements that prevents TIR-destroying dirt and moisture from lodging on the back surfaces which would in turn degrade or destroy the ability of the retroreflective elements to provide TIR. Unfortunately, metallization has the disadvantage of reducing the overall retroreflectance of the article. Unlike TIR, for which reflectance is 100%, aluminum has a reflectance of only about 85%. Consequently, the intensity of a retroreflected ray of light that is reflected off of three aluminized faces is reduced to about $(85\%)^3$ or roughly 61% of its corresponding TIR intensity. Illustrative examples of various attempts have been made to produce retroreflectors that enhance performance and/or improve on the entrance angles at which TIR occurs are disclosed in U.S. Pat. No. 6,172,810 (Fleming), U.S. Pat. No. 6,883,921 (Mimura), U.S. Pat. No. 8,651,720 (Sherman), U.S. Pat. No. 9,575,225 (Kim), U.S. Pat. No. 9,651,721 (Chapman), U.S. Pat. No. 9,910,194 (Benton Free), and U.S. Pat. No. 9,971,074 (Chatterjee).

Most retroreflective articles for transportation applications have also been optimized for application to surfaces such as roadways that are not necessarily smooth. Conformance layers, such as the ones described in U.S. Pat. No. 6,127,020 (Bacon), maintain the upward configuration of the cube corners that provide retroreflectivity. By making the retroreflector flatter using the conformance layer, the reflectance angle cone need not be as great as embodiments in which the macrostructure of a retroreflective tape was not as smooth. Other approaches for retroreflective articles for transportation applications disclose discrete pavement elements held in a carrier web that are then produce separated elements as a result of frangible connections between the discrete paving elements, as described in U.S. Publ. Appl.

No. 2003/0123931 A1 (Khieu) or a retroreflective tape that use transparent spheres embedded in a matrix and includes the addition of advanced materials such as high-index-of-refraction reflective elements, quantum emitters, dichroic pigments, and passive, machine-readable emitting tags for improved visibility as those described in U.S. Publ. Appl. No. 2016/0209559 A1 (McCarthy).

Most retroreflective articles used in connection with transportation applications have been optimized for nighttime detection in the visible spectrum, roughly 400-700 nanometers. With the advent of ADAS (Advanced Driver Assist Systems), ACC (Adaptive Cruise Control), LDW (Lane Departure Warning) Systems, LKS (Lane Keep Systems), and CAVs (Connected and Automated Vehicles), many automotive deployments are resorting to NIR (Near Infrared) active sensors to perform object sensing and detecting.

Various attempts have been made to enhance and/or provide selective retroreflective articles in different spectral ranges other than the visible spectrum. Illustrative examples of such broader spectrum retroreflective articles and materials are disclosed in U.S. Pat. No. 8,496,339 (Nakajima), U.S. Pat. No. 8,783,879 (Smith), U.S. Pat. No. 9,746,591 (Lu), and U.S. Pat. No. 9,964,676 (Nagahama).

Prior art pavement marking materials, and even road signage, can exhibit reduced performance in wet conditions due to varying optical paths for wet and dry conditions. Techniques used to increase performance for wet/dry pavement marking articles, for example, include approaches like adding glass or ceramic beads of different diameters to the article surface to account for varying optical paths for wet and dry conditions. This construction increases the cost of the article and reduces the durability.

In view of the increased requirements for retroreflective materials and articles designed for use with autonomous vehicle machine visions systems, there is a need for new approaches to the design, construction and use of retroreflective materials and articles for roadway and automotive purposes that can improve both daytime and nighttime performance, can be applicable to both visible and NIR spectrums, and/or can provide more consistent performance in different environmental conditions.

SUMMARY OF THE INVENTION

In various embodiments, the present disclosure provides for reflective materials, articles and methods incorporating a mesh arrangement of multiple, discrete retroreflective canted cube corner reflectors each having generally flat incident surfaces and high transparency, with a geometry and a refractive index ratio sufficiently high enough to produce a high degree of total internal reflection (TIR) that results in anisotropic retroreflectivity.

In embodiments, an anisotropic retroreflective mesh for pavement markings comprises a plurality of reflectors made of a material having a first refractive index and a binder material at least partially surrounding the plurality of reflectors having a second refractive index that is different from the first refractive index. Each of the plurality of reflectors has a geometry that includes a top surface defining a normal axis perpendicular thereto, a bottom right side surface, a bottom left side surface, and an end surface all arranged orthogonally to one another, the bottom right side surface, the bottom left side surface, and the end surface defining an apex axis along which the bottom right side surface, the bottom left side surface, and the end surface are equiangular, wherein an angle between the normal axis and the apex axis of each reflector is non-zero. The plurality of reflectors are arranged in a pattern defining the anisotropic retroreflective mesh such that each of the normal axes of the plurality of reflectors is substantially parallel to one another. The binder material is arranged adjacent to each of the bottom right side surface, the bottom left side surface, and the end surface of each of the plurality of reflectors.

In embodiments, a process of producing an anisotropic retroreflective mesh for pavement markings includes providing a plurality of reflectors, each of the plurality of reflectors including: a top surface defining a normal axis perpendicular thereto, co-orienting the plurality of reflectors in a mesh having a pattern in which each of the normal axes of the plurality of reflectors is substantially parallel to one another, and combining a binder material and the mesh of the plurality of reflectors such that the top surfaces of the plurality of reflectors are exposed. Each of the plurality of reflectors is provided with a geometry that includes a bottom right side surface, a bottom left side surface, and an end surface all arranged orthogonally to one another, the bottom right side surface, the bottom left side surface, and the end surface defining an apex axis along which the bottom right side surface, the bottom left side surface, and the end surface are equiangular, wherein an angle between the normal axis and the apex axis is non-zero. In combining the binder material and the mesh of the plurality of reflectors such that the top surfaces of the plurality of reflectors are exposed, the bottom right side surfaces, the bottom left side surfaces, and the end surfaces of the plurality of reflectors are arranged in contact with the binder material.

BRIEF DESCRIPTION OF THE DRAWINGS

FIGS. 13A and 13B illustrate a bi-directional, longitudinal reflective mesh according to an embodiment.

DETAILED DESCRIPTION OF THE EMBODIMENTS

Figure 1B:
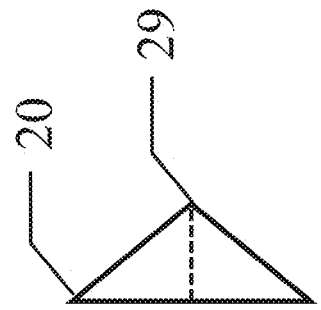
FIGS. 1B, 1C, and 1D are an end view, a side view, and a perspective view of the element of FIG. 1A, respectively.
Figure 1D:
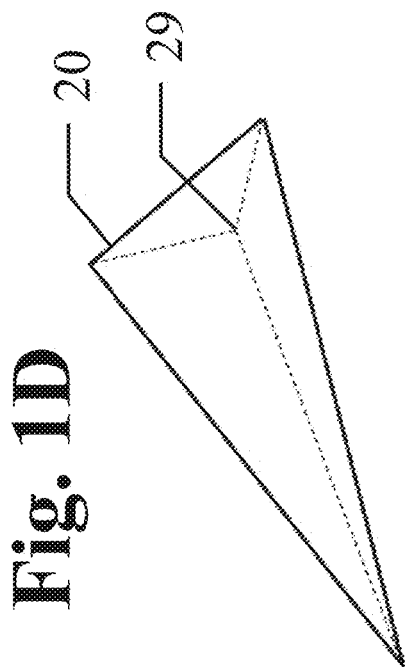
Figure 1A:
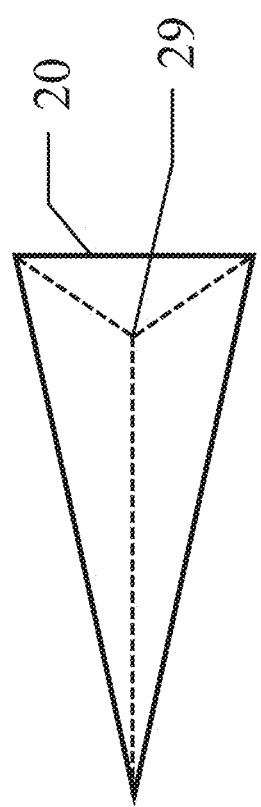
FIG. 1A illustrates a top view of a single element, three-face canted cube corner reflective element, according to an embodiment.
Figure 1C:
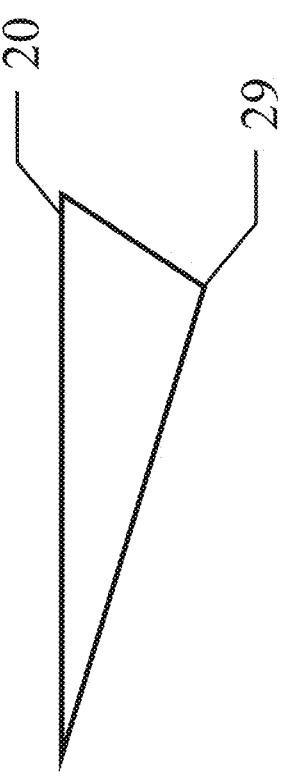

Pavement markings that rely on specular reflection and are thus considered non-TIR (Total Internal Reflection) generally include microspheres as the retroreflective elements and are produced in prefabricated form like reflective tapes or are produced in situ by applying binder materials to roadways and applying a layer of one or more microsphere types to the unset binder layer. The binder typically consists of paint, thermoplastic material, thermoset material, or other curable material. Examples of reflective pavement marking constructions utilizing microsphere beads as retroreflective elements are disclosed in U.S. Pat. No. 3,946,130 (Tung), U.S. Pat. No. 7,045,475 (Senturk), U.S. Pat. No. 7,168,815 (Shipman), U.S. Pat. No. 7,784,952 (Yukawa), U.S. Pat. No. 8,591,044 (Budd), U.S. Pat. No. 9,670,091 (Ryu), U.S. Pat. No. 9,790,372 (Greer), and Korean Appl. Nos. 10-2008-0066063 and 10-2010-0009432.

Multi-layer pavement markings with microspheres suffer from several shortcomings that inhibit their use for machine vision systems used in vehicle safety systems. First, microspheres use specular reflectance at the microsphere-to-binder layer, which results in lower levels of reflectivity than TIR. Second, microspheres rapidly lose adhesion with the binder layer, thus dramatically lowering the reflectivity of the article early in the life cycle. Third, different types of microspheres must be utilized for improved performance in both wet and dry conditions. Because wet-type microspheres do not reflect well in dry conditions and because dry-type microspheres do not reflect well in wet conditions, reflective efficiency of the overall article is reduced. Furthermore, the non-flat incident surface of the produced materials makes them less durable and produces inconsistent performance for wet/dry surface conditions.

For purposes of describing the various embodiments, the following terminology and references may be used with respect to reflective articles or materials in accordance with one or more embodiments as described.

"Surface" means an exterior boundary of an article or material. In some embodiments, a surface may interface with air or vacuum at least partially surrounding the article or material. In other embodiments, a surface may interface with another object, such as a lens or coating. A surface may be comprised of one or more facets, and may be either rigid or flexible in form, smooth or rough in texture, and homogenous or heterogeneous in composition.

"Top surface" or "incident surface" means a surface of an article or material exposed to electromagnetic waves, beams, or rays that strike the article or material and may be reflected or refracted by the article or material.

"Normal" describes a direction that intersects a surface or boundary at right angles.

"Entrance angle" is defined as the angle relative to normal of a ray, beam, or wave of electromagnetic radiation as it strikes an incident surface.

"Boundary" is a change of medium defined by a face, facet, surface, and/or material having a different index of refraction.

"Incidence angle" or "angle of incidence" is defined as the angle relative to normal of a ray, beam, or wave of electromagnetic radiation as it strikes a boundary within an article or material.

"Critical angle" is measured from a normal angle to a surface and is defined as the minimum incident angle at which TIR occurs at a surface. A critical angle is defined in the medium exhibiting the higher index of refraction.

"Cube corner element" describes a TIR retroreflective element, such as a trihedral pyramid, having multiple faces of the pyramid oriented at 90 degrees with respect to each other.

"Apex" means the tip of a cube corner pyramid as defined by the intersection of the edges of the faces of the pyramid other than the edges of the base of the pyramid.

"Apex axis" means a line intersecting the apex of a cube corner pyramid that is equidistant from each face of the pyramid.

"Longitudinal Pavement Marking" means a reflective element adhered, affixed to, or embedded into a top layer of a road surface used to identify the horizontal boundary, relative to a direction of travel, for an allowable lane of travel for a vehicle. Longitudinal refers to an orientation that is operably parallel to a direction of travel for a lane.

"Anisotropic" or "Anisotropy" refer to characteristics that are variant depending upon direction.

"Anisotropic Retroreflectors" or "Anisotropic Retroreflectivity" refers to an article or material that has retroreflective properties (caused by TIR) in at least one direction that is significantly stronger (with respect to the amount of light returned along a primary axis of that direction) and significantly weaker along a direction perpendicular or otherwise non-parallel to that primary axis. This behavior is also referred to herein as "highly directional performance."

"Mesh" refers to an arrangement of reflector elements in a patterned, grid or interlaced manner to provide a spaced relationship among those reflector elements. The mesh arrangement may be created by a material, construct, carrier, net, web, or binder, or by a roller or other delivery mechanism that defines, maintains or supports the pattern of spaced relationship among the reflector elements.

FIGS. 1A-1D illustrate four views of a single element, three-face canted cube corner reflector 20 according to an embodiment. In particular, FIGS. 1A, 1B, 1C, and 1D illustrate the top view, side view, end view, and perspective view of the reflector 20, respectively. The reflector 20 is transparent, as indicated by the dashed lines that correspond to portions of the reflector 20 that are behind the front surface in each of FIGS. 1A-1D. Additionally, FIGS. 1A-1D all indicate the location of the apex 29 of the cube corner element.

Figure 2:
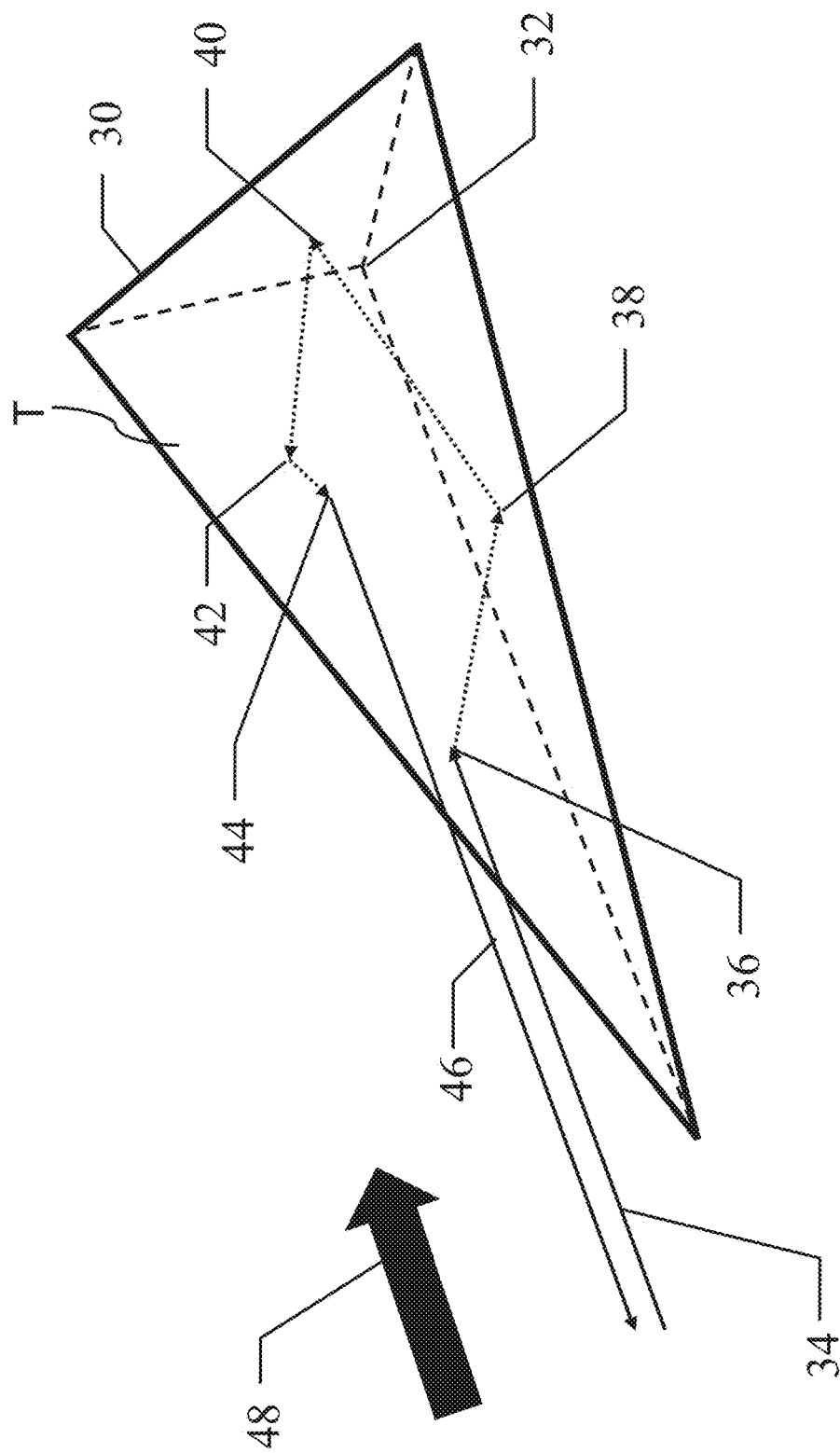
FIG. 2 illustrates ray tracing for incident, refracted and reflected light in a canted cube corner reflective element, according to an embodiment.

FIG. 2 illustrates ray tracing for incident, refracted and reflected light in a canted cube corner reflector 30 in air ($\eta=1$) that enables highly directional performance for a longitudinal pavement marking embodiment. Highly directional performance refers to a the performance of devices having a small range of entrance angles for which incident light is retroreflected well after undergoing TIR within the reflector 30. Reflector 30 is anisotropic in that the range of incident entrance angles that results in high retroreflectivity is relatively small and focused around a single direction, indicated by arrow 48.

As shown in FIG. 2, an incident ray 34 encounters the top surface T of reflector 30. From top surface T, the ray is refracted into the reflector 30 at location 36. The refracted incident ray encounters a side surface at location 38 and is reflected. The first reflected ray encounters the end surface at location 40 and is reflected. The second reflected ray encounters an opposite side surface at location 42 and is reflected. The third reflected ray encounters the top surface at location 44 and is refracted as a ray 46 that is parallel to and in the opposite direction of the incident ray 34. The amount of reflection at locations 38, 40 and 42, representing reflections off two side surfaces and an end surface, will depend of the reflector 30 material type, the material type in which the reflector 30 is embedded, and the incident angles at which rays encounter surfaces relative to the three surface normal angles.

Figure 3:
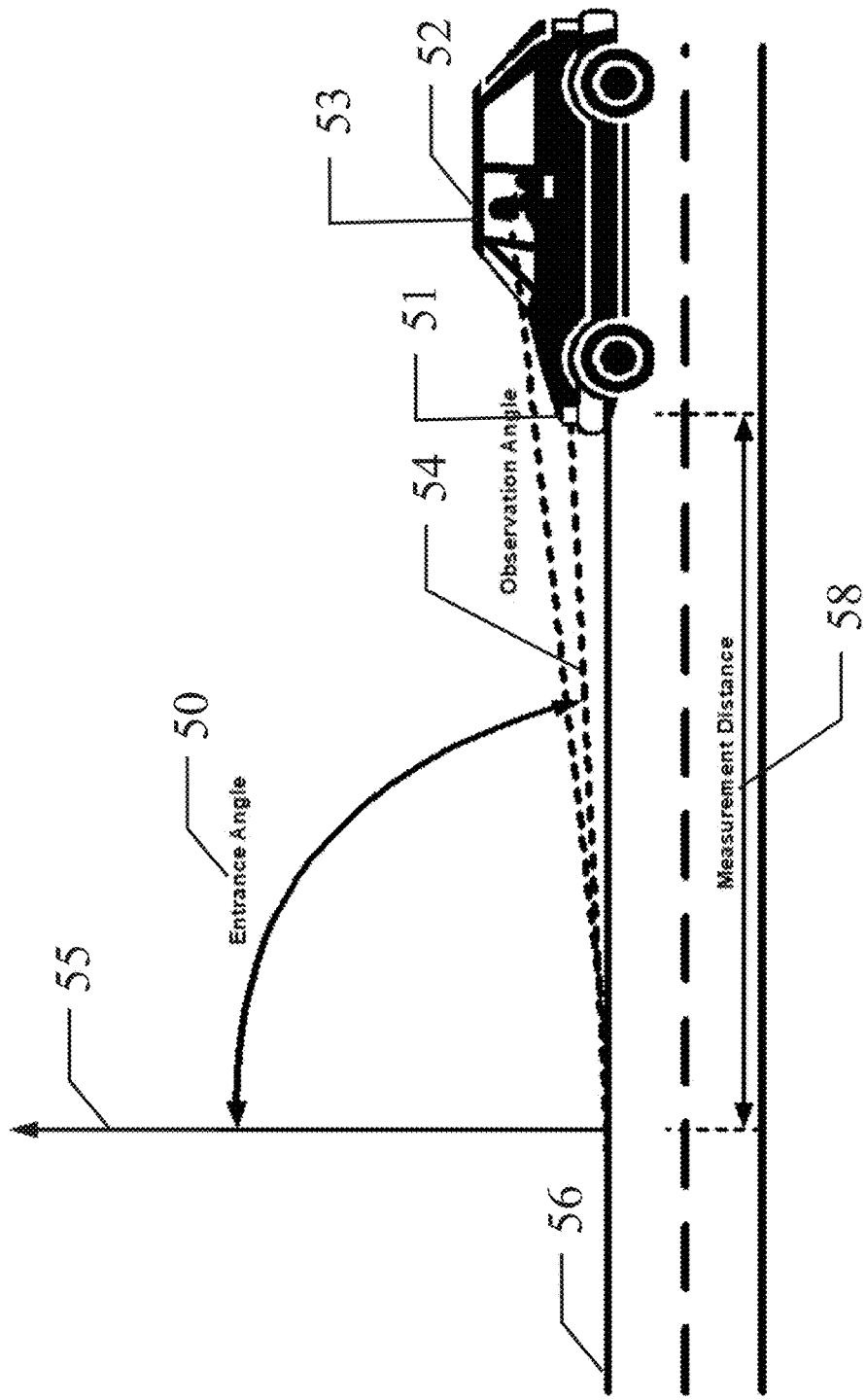
FIG. 3 illustrates a schematic view of retroreflection at a longitudinal pavement marking.

FIG. 3 shows a geometry for a longitudinal pavement marking 56. A vehicle 52 includes both headlamps 51 and a sensor 53. In embodiments, the driver may essentially perform the function of the sensor 53, in that the primary purpose of the retroreflected light is to provide clear and visible road markings to a driver. Alternatively, in embodiments the pavement marking 56 may be intended to return light to a different sensor, such as a visible light sensor or a sensor for other wavelengths that provides road marking information to a computerized or self-driving vehicle system. Similarly, it should be understood that in embodiments the headlamps 51 could be replaced by some other emitter that generates a desired frequency or spectrum of light that can be detected by the sensor 53.

The entrance angle 50 is defined as the angle formed by the direction of the ray 54 from the illuminator (the headlamps, in FIG. 3) to a point on the longitudinal pavement marking 56 and the normal angle 55 to the same point on the pavement marking 56. In the United States, pavement markings 56 are typically evaluated utilizing 30-meter geometry based on ASTM standards, consisting of a measurement distance of 30 meters (shown at 58) and an entrance angle 50 of 88.76 degrees (shown at 52).

TIR retroreflectivity for a reflector with a flat top surface and cube corner surfaces will be defined by the indexes of refraction of the medium that interfaces with the top surface (typically air or water), the index of refraction of the material used to produce the reflector, and the index of refraction of the material into which the cube corner surfaces are embedded. The critical angle at cube corner surface is referenced from the cube corner normal angle and is defined by Snell's law:

$$\eta_1 = \sin\theta_1 = \eta^* \sin\theta_2 \qquad \text{Eq. 1}$$

where
$\eta_1$ is the index of refraction of medium 1
$\theta_1$ is the angle of the wave in medium 1
$\eta_2$ is the index of refraction of medium 2
$\eta_2$ is the angle of the wave in medium 2

Figure 4:
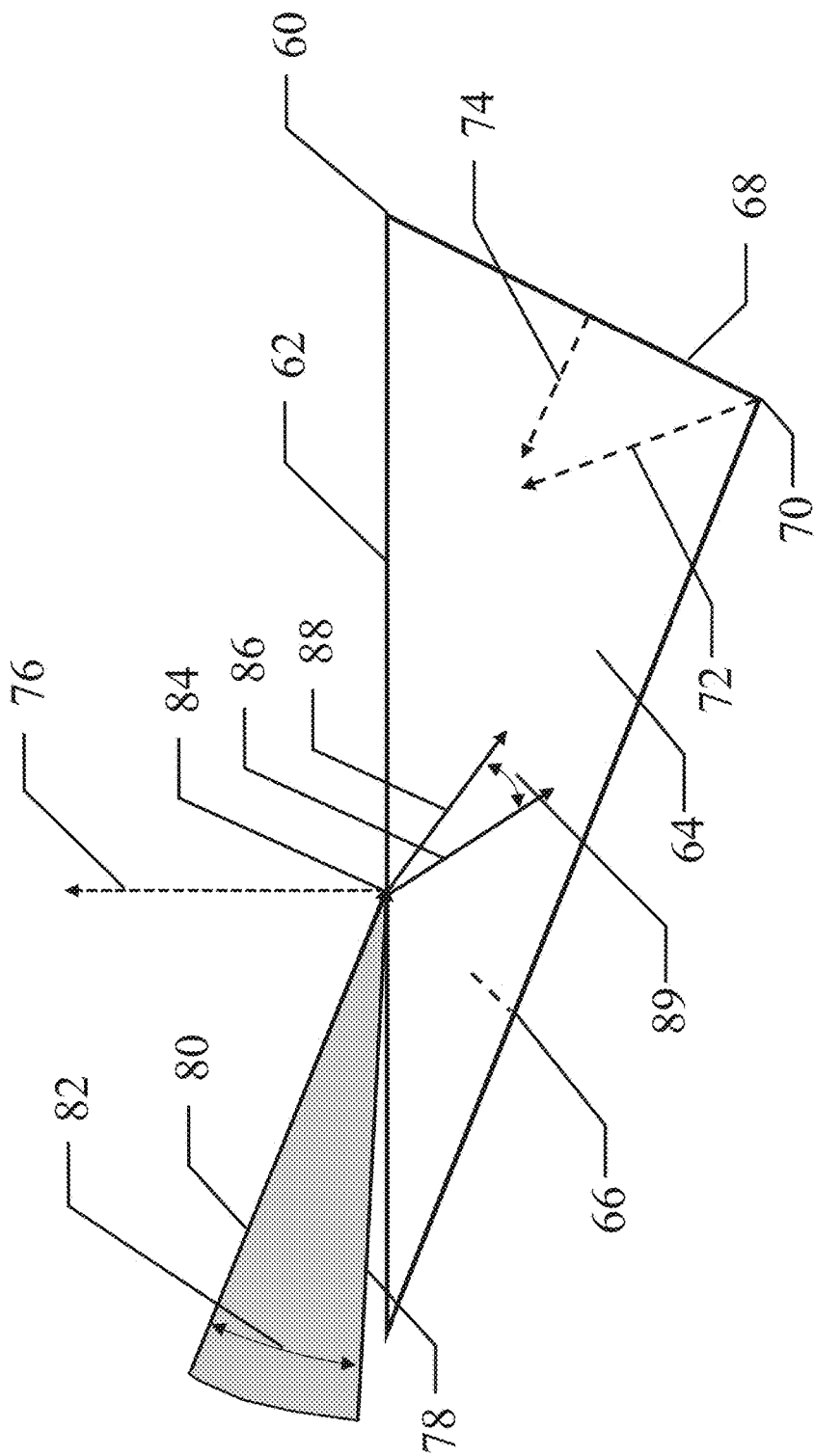
FIG. 4 illustrates shows a side view of a highly directional TIR reflective element according to an embodiment.

FIG. 4 shows a side view of a highly directional TIR reflector 60 for use in a longitudinal pavement marking embodiment. The reflector 60 is defined by a top surface 62 with a top surface normal angle 76, a right-side surface 64 where "right" is used to denote a side surface relative to a view aligned with the axis of a highly directional incident ray that experiences high TIR, a left-side surface 66, and an end surface 68. For the reflector 60 shown, the right-side surface 64, left-side surface 66 and the end surface 68 form a cube corner whereby all three surfaces connect at an apex 70 defined by an apex axis angle 72. Although shown as a ray in FIG. 4, it should be understood that the apex axis "angle" refers to the offset from vertical in that drawing, or in other words the angle between the ray indicated at 72 and the ray indicated as normal angle 76.

A range of entrance angles 82 indicates the minimum in-medium entrance angle 80 and maximum in-medium entrance angle 78 for the desired operating range for incident light for a reflector 60 with a highly directional response. Based on reflector 60 material properties and properties of the material into which a reflector 60 is embedded, a reflector 60 will experience TIR at one or more of the surfaces 64, 66, 68. Incident radiation from a medium like air or water will experience refraction at a location 84 at the top surface 62. As a result, the range of in-reflector ray angles 89, defined by the minimum in-reflector refracted ray angle 88 and the maximum in-reflector refracted ray angle 86 are determined according to Eq. 1. Due to the anisotropic, highly directional design and the apex axis angle 72 of the reflector 60, incident radiation may experience TIR at the right-side surface 64 and the left-side surface 66. Allowable ranges of the apex axis angle 72 are governed by the index of refraction of the medium, the index of refraction of the reflector 60 material, and the desired minimum in-medium entrance angle 80. In order for the end surface 68 to properly direct light into the cube corner construct as the first encountered surface or to properly direct light out of the cube corner construct as a second or third encountered surface, the end surface normal angle must conform to:

$$\text{Angle}_{EndSurfaceNormal} > \text{Angle}_{RefractedMinEntranceTIR} \qquad \text{Eq. 2}$$

Where
$\text{Angle}_{EndsurfaceNormal}$ is the normal angle for the end surface, and
$\text{Angle}_{RefractedMmEntranceTIR}$ is the refracted version of the minimum entrance angle for reflector TIR.

Utilizing the relationship for the normal angle 74 for the end surface relative to the apex axis angle 72 defined as:

$$\text{Angle}_{ApexAxis} = \text{Angle}_{EndSurfaceNormal} - 45° \qquad \text{Eq. 3}$$

Eqs. 1, 2, and 3 are combined to define the minimum apex axis angle as:

$$\text{Angle}_{ApexAxis} > 45 - \sin^{-1}[(\eta_1/\eta_2)^* \sin\theta_1] \qquad \text{Eq. 4}$$

Where
$\eta_1$ is the index of refraction of the medium
$\eta_2$ is the index of refraction of the material used for a reflector, and
$\theta_1$ is the minimum desired entrance angle of the incident ray encountering the reflector top surface.

For longitudinal pavement markings, it is desirable to have highly reflective reflectors that operate at entrance angles 82 of between about 80° and about 90°. Utilizing a minimum entrance angle of 80°, minimum apex axis angles 72 for reflectors produced with various materials ($\eta_2$) having an index of refraction greater than that of the medium ($\eta_1$), in accordance with Eq. 4, are as follows:

| Reflector Material Index of Refraction | Minimum Apex Axis Angle |
| --- | --- |
| 1.5 | −4.0° |
| 1.59 | −6.7° |
| 1.8 | −11.8° |
| 2.1 | −17.0° |
| 2.4 | −20.8° |

In addition to selecting an apex axis angle 72 to ensure cube corner performance for the end surface 68 for the desired range of entrance angles, it is desirable for the angle between 74 and 76 to be high enough to promote TIR at the right-side surface 64 and the left-side surface 66. By increasing the angles at which refracted rays encounter side surfaces 64, 66, materials may be utilized for reflector 60 production with lower indices of refraction while maintaining a high percentage of TIR at side surfaces 64, 66 for entrance angles 82 of between about 80° and about 90°.

Figure 5:
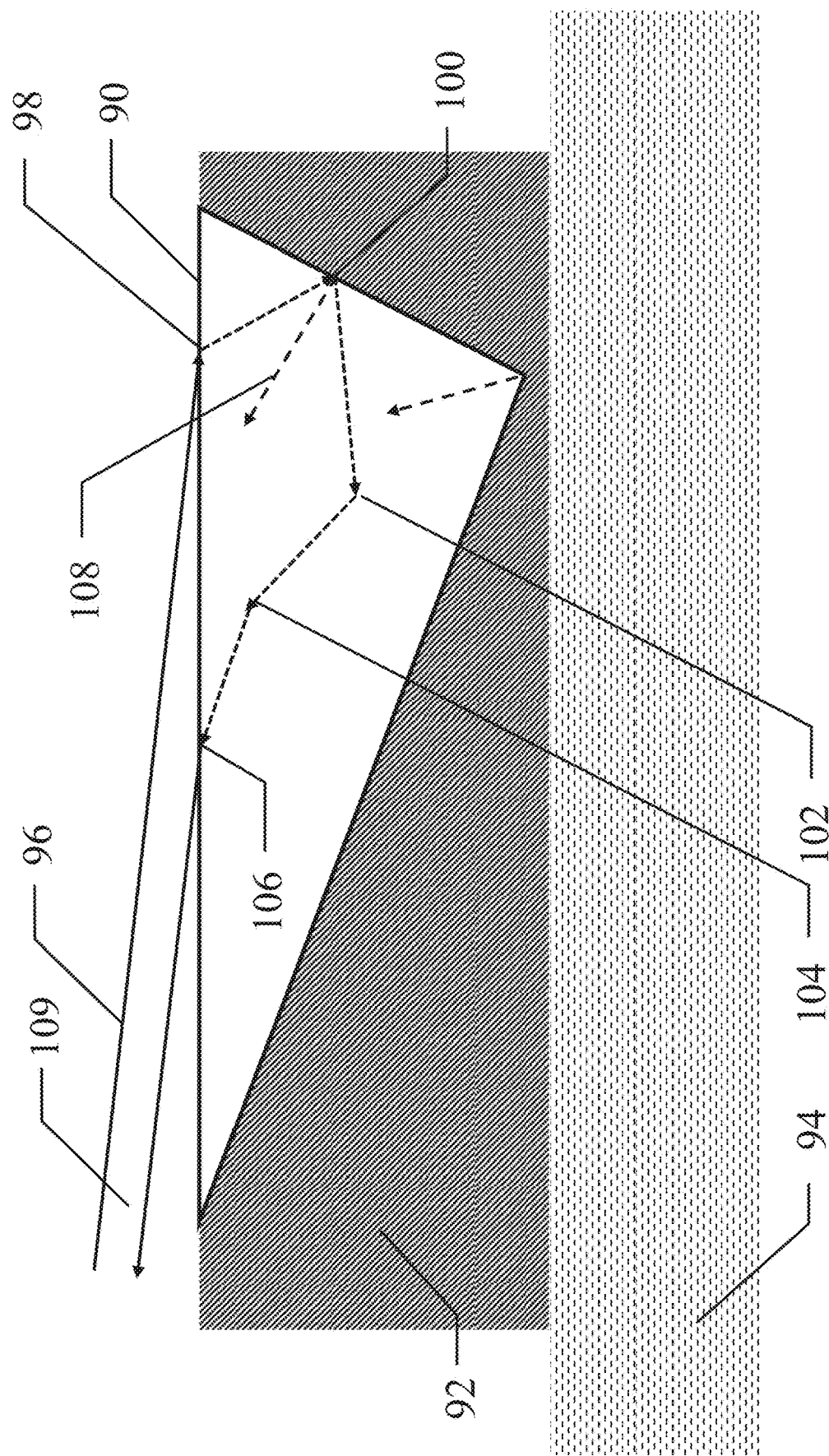
FIG. 5 illustrates an element embedded in a binder material, according to an embodiment.
Figure 14:
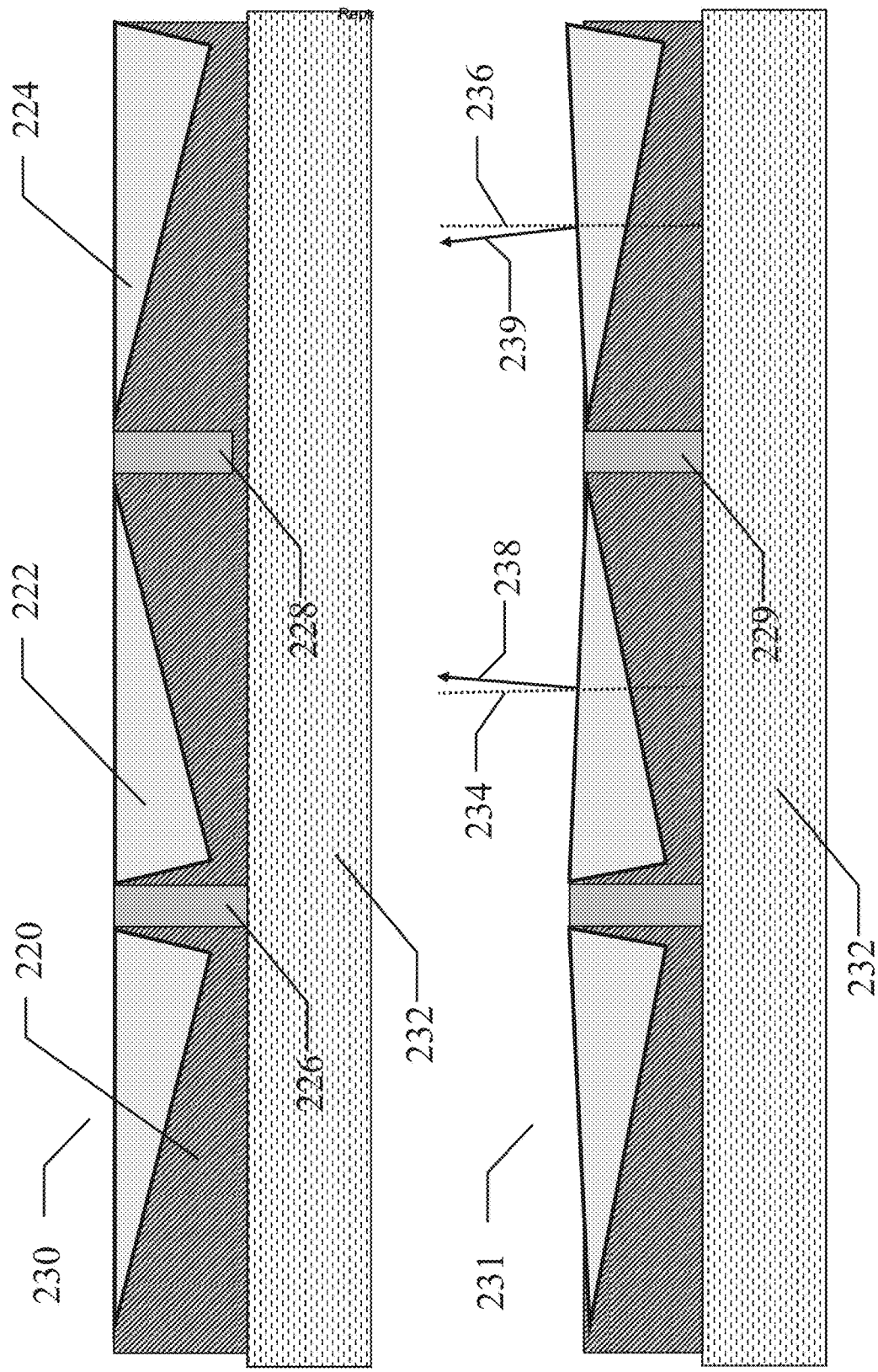
FIG. 14 illustrates a pavement marking construction configured to maintain a uniform surface, according to an embodiment.

FIG. 5 illustrates a side view of an anisotropic cube corner reflector 90 for use in a longitudinal pavement marking embodiment. The reflector 90 is embedded in a binder material 92 that such that an arrangement of reflectors 90 in the binder material 92 form a mesh of retroreflectors that are affixed to the surface of a roadway 94. In embodiments, binder material 92 can be paint, thermoplastic material, thermoset material, or other curable material, among others. In some embodiments, the binder material 92 flows into and around each reflector 90 as shown in FIG. 5 to form the mesh of retroreflectors. In other embodiments, as shown for example in FIG. 14, the binder material 92 is one layer of a multilayer arrangement in which reflectors 90 are spaced apart in a pattern by another layer comprised of a matrix of material, standoffs and/or interconnecting structures.

As depicted in FIG. 5, an incident ray 96 encounters a point 98 at the top surface and is refracted into the reflector 90. The first refracted ray is reflected about the end surface normal angle 108 at point 100. The amount of reflected light depends on whether the reflection is TIR or specular reflection. The first reflected ray is reflected about one side surface normal angle at point 102 and is reflected about a second side surface normal angle at point 104. The resulting refracted and triple-reflected ray is refracted a second time at a point 106 at the top surface such that the outgoing ray 109 is substantially parallel to and in the opposite direction of the incident ray 96.

Figure 6:
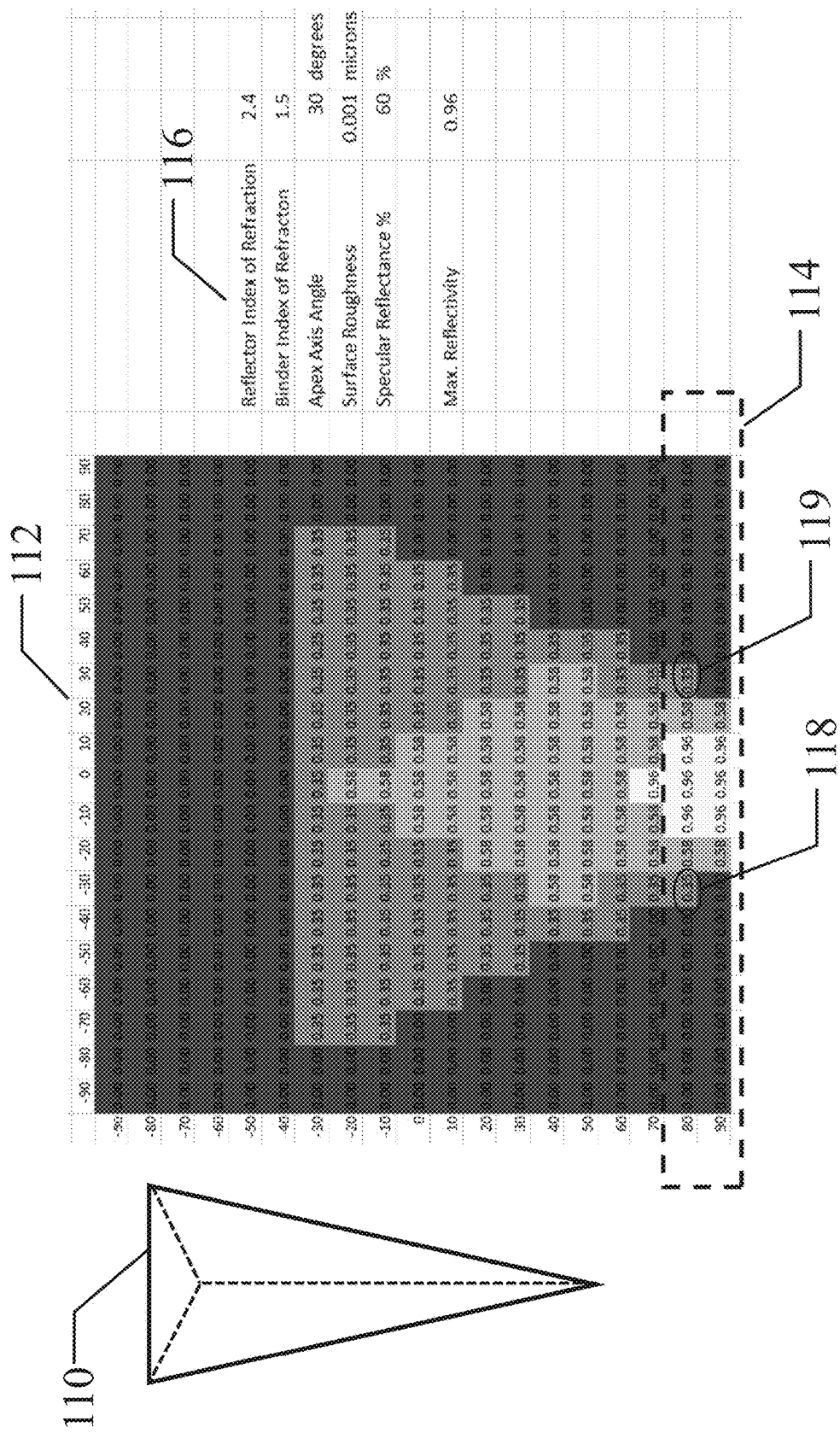
FIG. 6 illustrates the graphical output of a radiance model that determines the reflective performance of a reflective element, according to an embodiment.

FIG. 6 illustrates the graphical output of a radiance model that determines the reflective performance of a reflector 110 in accordance with various embodiments. The numbers in the radiance model intensity plot 112 denote the retroreflectivity of a single retroreflective element and will range from 0.00 for no retroreflectivity to 1.00 for total retroreflectivity with no losses. The cells in the intensity plot 112 refer to intensities at various possible entrance angles for a retroreflective element with a flat top/incident surface. Entrance angles are determined according to a horizontal entrance angle axis and a vertical entrance angle axis. A parameter table 116 denotes the construction of the retroreflective element. Based on the parameters in the table 116, the reflectivity is determined for the chosen geometry and material.

A radiance model intensity plot 112 is based on five selectable parameters. Reflector Index of Refraction refers to the refractive index of the material from which the reflector 110 is produced. Binder Index of Refraction refers to the refractive index of the material that abuts, interfaces to, or is adhered to the cube corner surfaces of the reflector 110. Apex Axis Angle refers to the angle at which the surfaces of each cube corner construction are equiangular and is measured relative to the normal angle for the top surface of the reflector 110. An apex axis angle of 0 degrees refers to cube corner constructions whereby the apex axis angle is collinear to and in the same direction as the normal angle at the top surface of the reflector 110. Surface roughness refers to the average deviation of the ideal flat surface from the actual surface. Cube corner surfaces that are ideally flat and exhibit TIR will reflect 100% of an incident signal. Cube corner surfaces that exhibit roughness will result in TIR amounts that are less than 100%. For incident signals within a cube corner construct that encounter the face at an angle that is less than the critical angle, some or all of the signal will cross the boundary and will be subjected to specular reflectivity at the surface boundary. The amount of specular reflectance will be less than 100% and will be determined by the specular reflectance properties of the binder material.

Reflector reflectivity is the total of all reflectivity at the three surfaces of a cube corner and is defined by Eq. 5 below:

$$\int_{\rho=-90}^{\rho=+90}\int_{\varphi=-90}^{\varphi=+90}\prod_{s=1}^{s=3} R(\theta.sub.s)$$

Where

ρ=horizontal angle of incidence at the reflector top surface,

φ=vertical angle of incidence at the reflector top surface, s is a variable representing the three surfaces of a cube corner construct, $R(\theta_s)$ is the reflectivity of the wave at the boundary of the surfaces of a cube corner construct, with:

$R(\theta_s)$=1 for TIR, and $R(\theta_s)$=percent specular reflectance for non-TIR, and θs is the incident angle of a ray at the surface s relative to the surface s normal angle.

FIG. 6 illustrates a radiance model intensity plot 112 for a highly-directional reflective reflector 110 with parameter table 116 values as shown below:

| | |
|---|---|
| Reflector Index of Refraction | 2.4 |
| Binder Index of Refraction | 1.5 |
| Apex Axis Angle | 30 degrees |
| Surface Roughness | 0.001 microns |
| Specular Reflectance Percentage | 60% |

The selection of an index of refraction of 2.4 typically means the resulting reflector will be rigid and will likely have a high melting point, both of which are properties that can result in higher manufacturing costs. The binder index of refraction is selected at the high end of a range of possible binder materials that may include epoxy and/or polyurethane. The index of refraction of binder materials can range from 1.34 to 1.51 in such embodiments. A binder material with a higher index of refraction will place a stricter requirement on a reflector 110 from a TIR standpoint due to the lower difference in the indices of refraction between the binder and reflector, which results in a lower critical angle at the reflector-to-binder boundaries. An apex axis angle of 30 degrees results in the end surface of a highly-directional reflector 110 having a surface angle of −15° relative to the top surface normal angle. Because pavement markings produced with binder materials and microspheres utilize specular reflectance, binder materials for pavement markings will typically exhibit high specular reflectance values. A specular reflectance value of 60% in the parameter table 116 specifies that for signals that encounter a surface at an angle that is less than the critical angle, the reflected signal intensity will be 60% of the incident signal intensity.

For longitudinal pavement markings, it is desirable to have highly reflector 110 whereby the best reflective performance is at entrance angles between 80° and 90°. Reflectivity values for this range 114 of vertical (or longitudinal) entrance angles are shown in FIG. 6. In embodiments that utilize materials and geometry that conform to the values from the parameter table 116, vertical (or longitudinal) entrance angles of 80 degrees will exhibit some TIR for horizontal (or lateral) entrance angles from −30 degrees as indicated at reference number 118 to +30 degrees as indicated at reference number 119.

Figure 7:
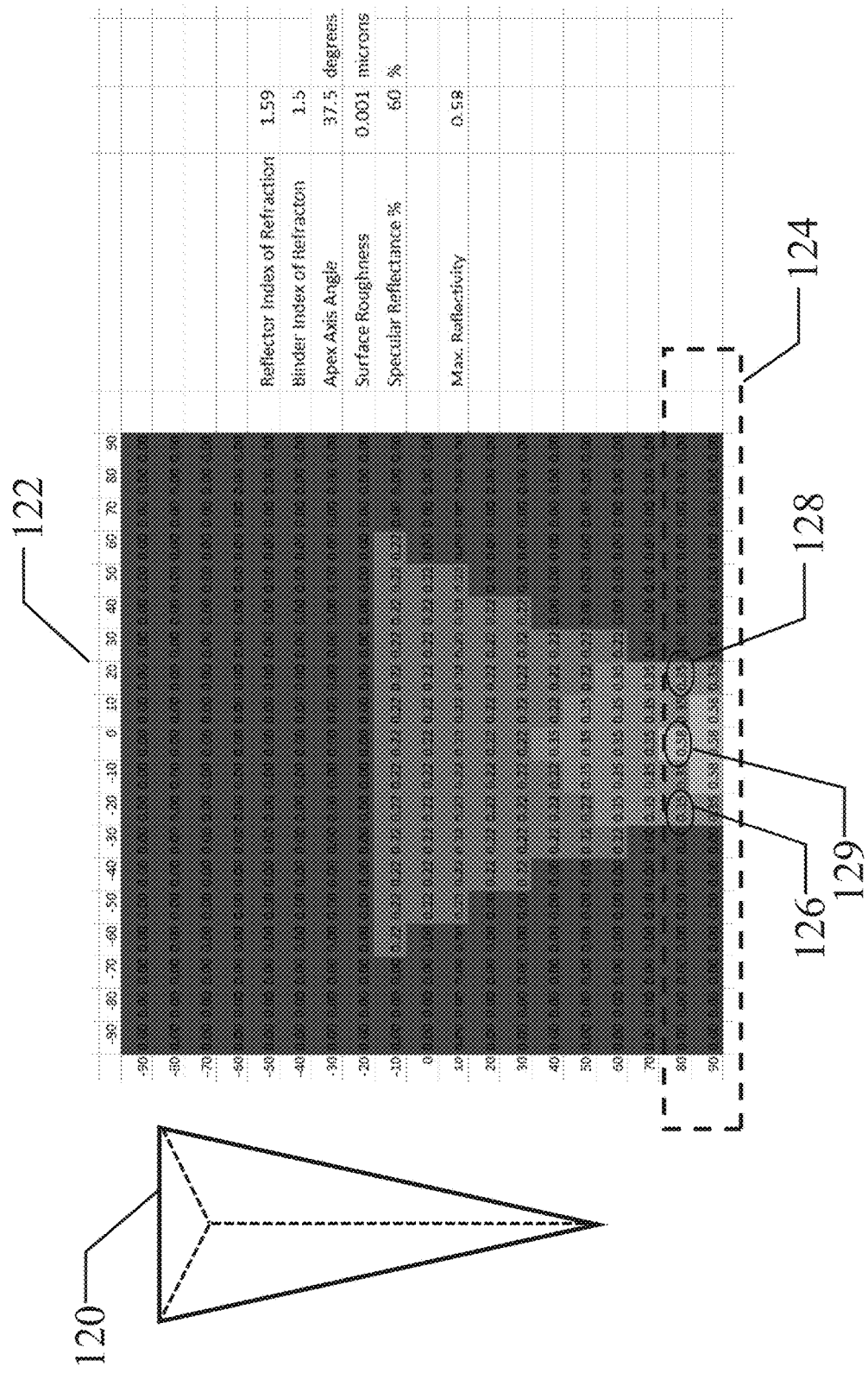
FIG. 7 illustrates radiance model intensity plots for a two-element embodiment.

Reflectors produced from transparent, durable materials that exhibit a high index of refraction will typically require a production process that requires a high amount heat, typically over 1500 degrees C. In embodiments, reflectors are produced from materials that are conducive to a lower-heat web process, made from flexible, transparent materials like polycarbonate. FIG. 7 illustrates a radiance model intensity plot 122 for a highly-directional reflector 120 with parameter table values as shown below:

| | |
|---|---|
| Reflector Index of Refraction | 1.59 |
| Binder Index of Refraction | 1.5 |
| Apex Axis Angle | 37.5 degrees |
| Surface Roughness | 0.001 microns |
| Specular Reflectance Percentage | 60% |

The intensity plot 122 indicates that for incident rays that exhibit reflection off all three surfaces of a cube corner construct, most of the incident angles produce reflected intensities (indicated by 0.22 values) due to specular reflection off all three surfaces. In embodiments vertical (or longitudinal) entrance angles of 80 degrees will exhibit TIR for one of the side surfaces, indicated by 0.35 reflected intensity values, for horizontal (or lateral) entrance angles from −20 degrees 126 to +20 degrees 128. In embodiments vertical (or longitudinal) entrance angles of 80 degrees will exhibit TIR for both of the side surfaces, indicated by 0.58 reflected intensity values, for horizontal (or lateral) entrance angles at 0 degrees 129.

Using Eq. 1, the critical angle in a material forming a surface with a material having a lower index of refraction is defined as:

$$\theta_c = \sin^{-1}(\eta_1/\eta_2) \quad \text{Eq. 6}$$

Where $\eta_1$ is the index of refraction of the material with a lower index of refraction, and $\eta_2$ is the index of refraction of the material with a higher index of refraction.

For a reflector in accordance with FIG. 7 with a reflector index of refraction of 1.59 and a binder index of refraction of 1.5, Eq. 6 results in a critical angle of 70.6 degrees. Due to the high critical angle for cube corner surfaces, most of the reflections within a cube corner construct will exhibit specular reflection. In embodiments, a lower index of refraction coating for cube corner surfaces decreases the critical angle, resulting in a higher percentage of incident rays that result in one-, two-, or three-surface TIR.

Figure 8:
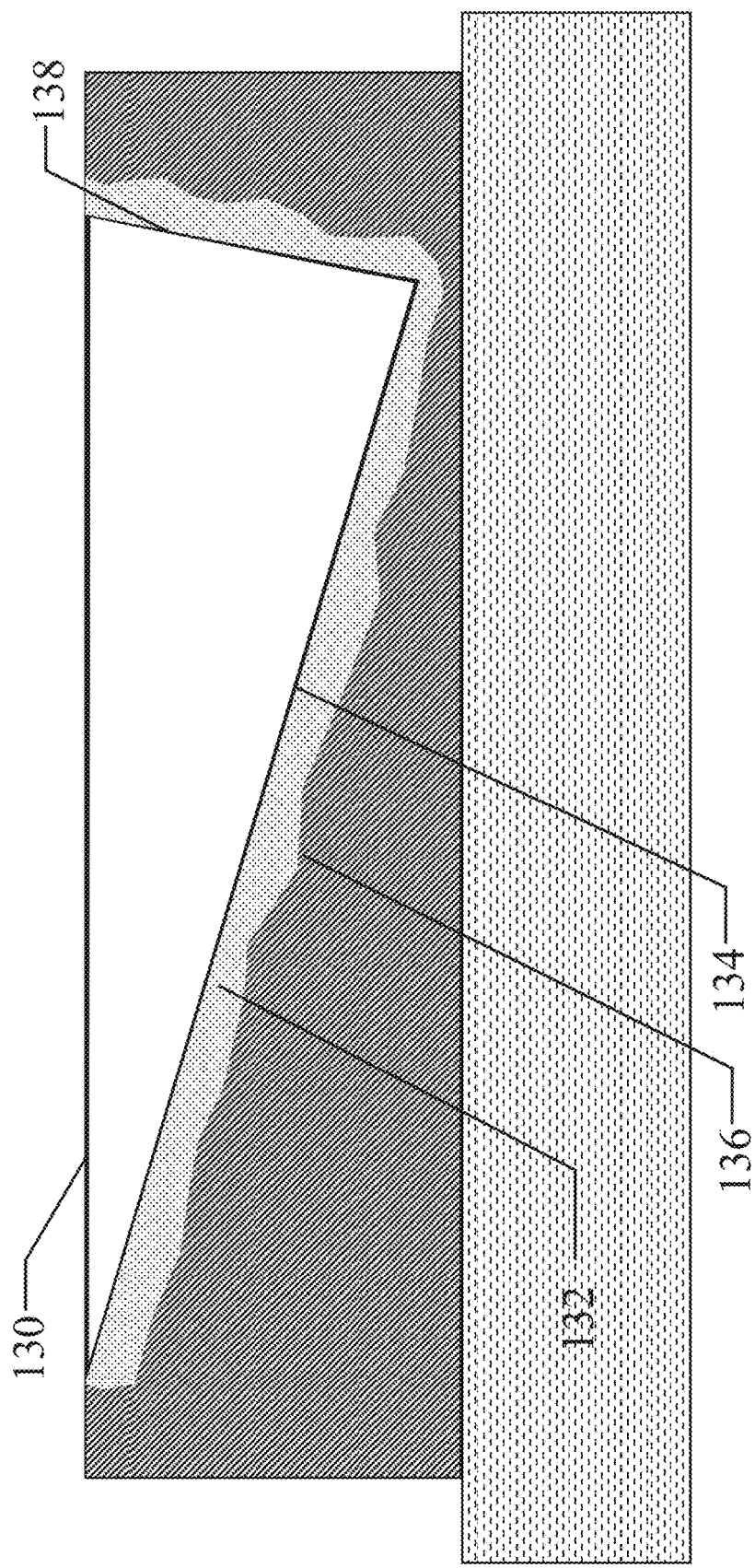
FIG. 8 illustrates highly-directional reflective elements, according to an embodiment.

FIG. 8 illustrates a construction of an anisotropic reflector 130 with a low-index-of-refraction opaque coating 132 applied to the three cube corner surfaces that are within a binder. The addition of an opaque coating 132 has the effect of decreasing the critical angle at the three surfaces of the reflector 130. In embodiments, the opaque coating 132 is affixed flush to the three cube corner surfaces, thus realizing a flat optical surface 134 at the reflector 130 to coating 132 boundary. Because the non-reflector surface 136 of the opaque coating does not function as an optical surface, there are no optical requirements for the smoothness of the non-reflector surface 136. In embodiments, materials that exhibit opacity with a low index of refraction may include, but are not limited to, polyurethane foam ($\eta=1.34$), polyisobutylene ($\eta=1.4$ to 1.5), or fluorinated polyethylene ($\eta=1.31$ to 1.4), for example. For a reflector 130 in accordance with FIG. 8 with a material index of refraction of 1.59 and an opaque coating 132 index of refraction of 1.34, Eq. 6 results in a critical angle of 57.4 degrees. In embodiments, for highly-direction reflectors 130, a range of incident angles for which high reflectivity is specified is 80° to 90°. For this range of incident angles, a highly-directional reflector 130 in accordance with embodiments will exhibit TIR for the two side surfaces and will exhibit specular reflection for the end surface 138.

In embodiments, the effect caused by opaque coating 132 can be created either by coating the binder in which a reflector is positioned, or alternatively by coating the reflector itself. From a manufacturing perspective, one of these may be easier than the other in various embodiments. In some embodiments, an opaque coating (e.g., 132) is not required and instead an air gap, fluid gap, paint, epoxy, polymer, or any other material could be positioned between (or impregnated into) the binder or the reflector in order to promote TIR at desired angles of incidence.

Figure 9:
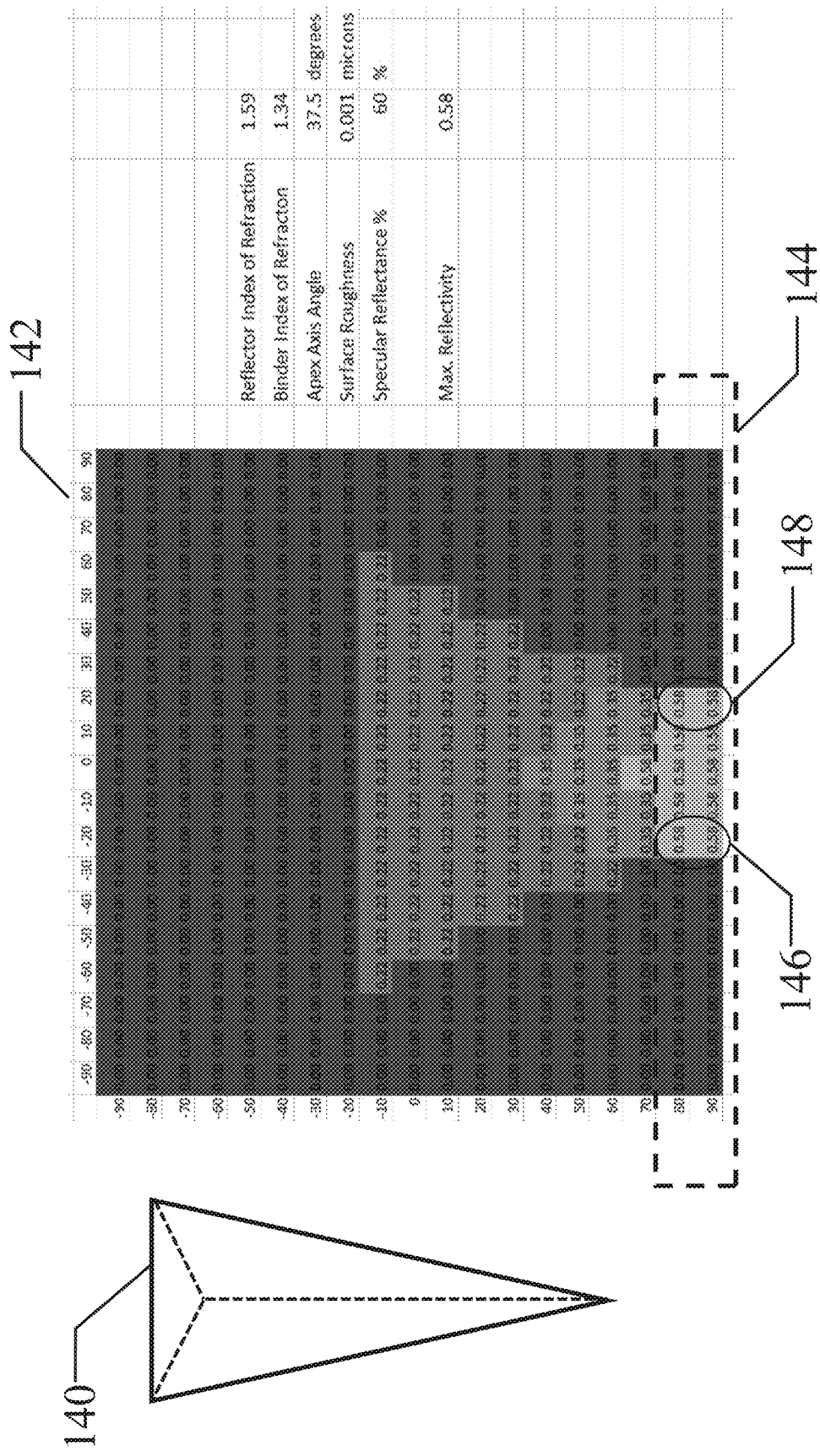
FIG. 9 illustrates radiance model intensity plots for a two-element embodiment.

FIG. 9 illustrates a radiance model intensity plot 142 for a highly-directional reflective reflector 140 with parameter table values as shown below:

| | |
|---|---|
| Reflector Index of Refraction | 1.59 |
| Binder Index of Refraction | 1.34 |
| Apex Axis Angle | 37.5 degrees |
| Surface Roughness | 0.001 microns |
| Specular Reflectance Percentage | 60% |

The intensity plot 142 indicates that for incident rays that exhibit reflection off all three surfaces of a cube corner construct, most of the incident angles produce reflected intensities (indicated by 0.22 values) due to specular reflection off all three surfaces. In embodiments vertical (or longitudinal) entrance angles in the range 144 of 80-90 degrees will exhibit TIR for both of the side surfaces, indicated by 0.58 reflected intensity values, for horizontal (or lateral) entrance angles from −20 degrees 146 to +20 degrees 148.

Figure 10A:
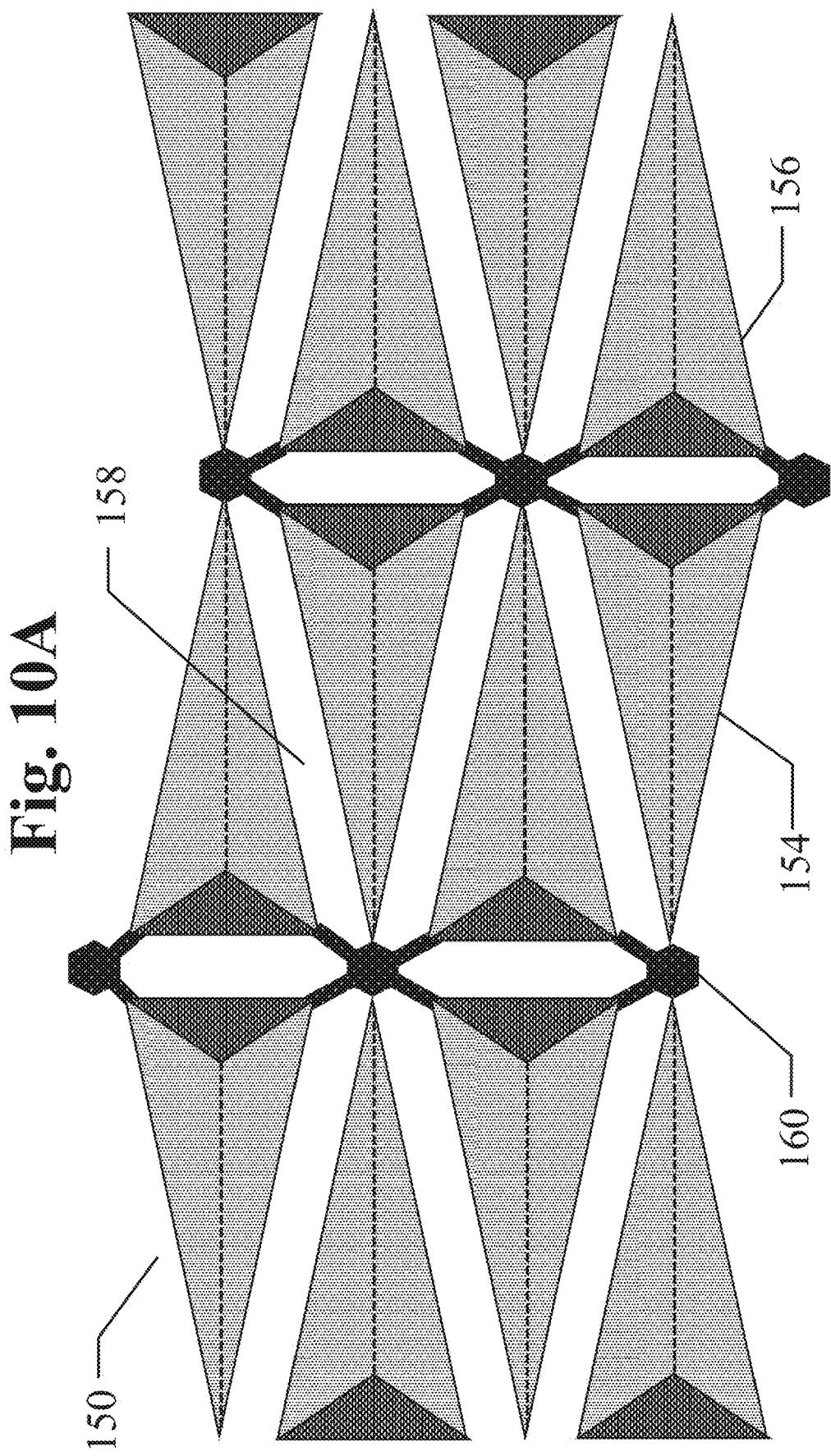
FIGS. 10A and 10B illustrate highly-directional reflective elements, according to embodiments.
Figure 10B:
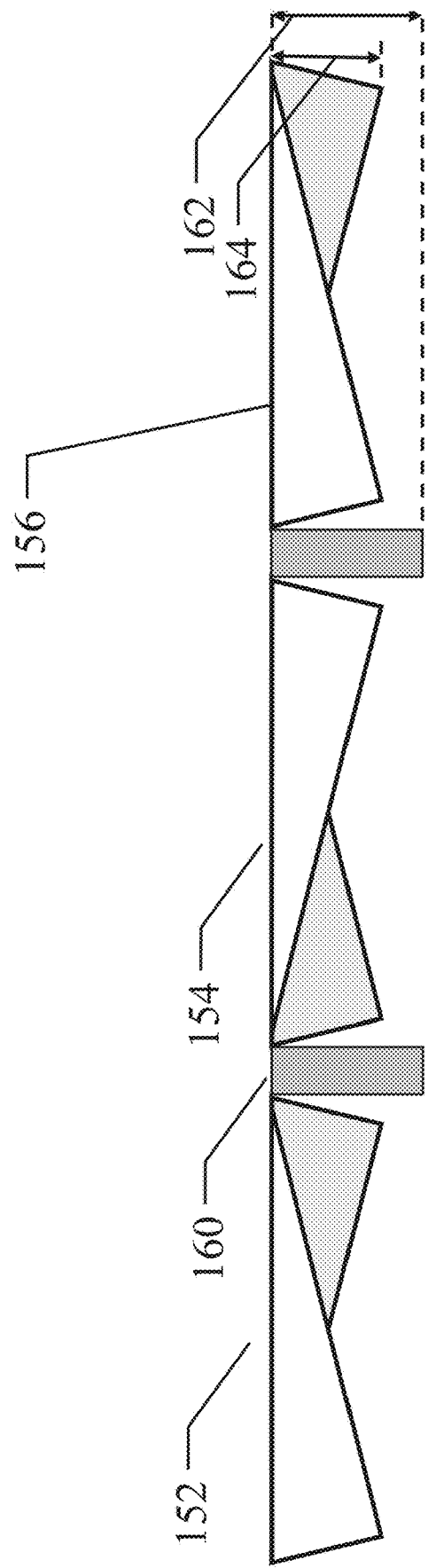

FIGS. 10A and 10B illustrate a top view 150 and a side view 152 of a construction of a reflector mesh, respectively. In embodiments, the interconnected highly-directional reflectors 154, 156 are organized within the mesh to provide highly directional reflectivity for longitudinal pavement markings at entrance angles consistent with bi-directional vehicle traffic in two roughly diametrically opposing directions (similar to a conventional 2-way highway or road). In embodiments, reflectors 154, 156 are separated within the mesh to allow an air gap 158 between reflector 154, 156 edges, thus allowing in situ pavement markings to optically present two material types to sensing elements—the top surface of reflectors 154, 156 and the top, flat surface of the binder material to which the mesh is affixed and into which the mesh is embedded. Pavement marking binder material is typically installed on roadways or airport runways at predetermined thicknesses. In the United States, for example, binder thicknesses for pavement markings will typically be 0.012 inches to 0.025 inches for paint and epoxy and 0.040 inches to 0.1 inches for thermoplastic or methyl methacrylate. In embodiments, in order to avoid over-embedding of a reflector mesh into a binder, mesh standoff elements 160 are utilized to situate the top surface of reflectors a known height 162 above a roadway. In embodiments, a standoff 160 height 162 is typically equal to the binder thickness to which the mesh is affixed and into which the standoff 160 is embedded. In embodiments, a standoff 160 height 162 is greater than or equal to a maximum vertical dimension 164 of a reflector 154, 156.

Figure 11:
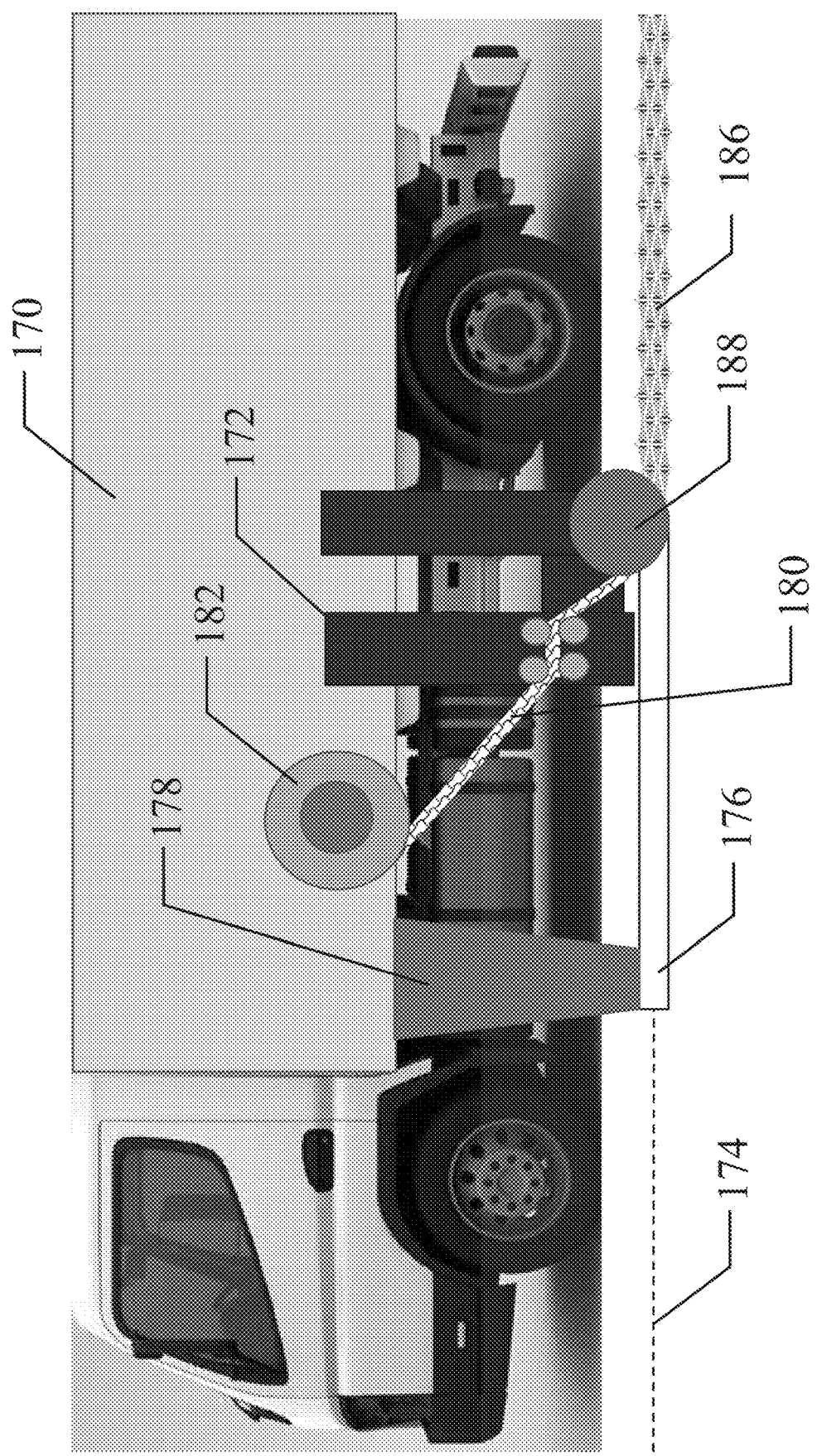
FIG. 11 illustrates a vehicle configured to install a binder and a reflective mesh, according to an embodiment.

FIG. 11 illustrates embodiments for a vehicle 170 utilized for installation of binder 176 and a reflective mesh 180. A vehicle 170 disposes a binder 176 along a desired longitudinal path 174 on a roadway. Binder 176 is disposed from a mechanism 178 that controls the thickness and location of the binder 176 and could be similar to a conventional lane marking painting apparatus in some embodiments. In embodiments, a reflective mesh 180 is directed by a supply spool 182. As the reflective mesh 180 is directed below a pressure applicator 188, the reflectors from the mesh 180 are transferred to and embedded in the binder 176. In embodiments, a cutting/feeding station 172 controls the feeding of the mesh 180 to the pressure applicator 188 and cuts the mesh 180 to the desired length for termination of a solid longitudinal line or to the desired length for a longitudinal skip line. In embodiments, the result of the installation process is a longitudinal pavement marking 186 with exposed binder and the top side of exposed reflectors in a flush-mounted configuration, thus allowing optical access to both optical components (binder and reflectors) for vehicles traversing a roadway.

Figure 12:
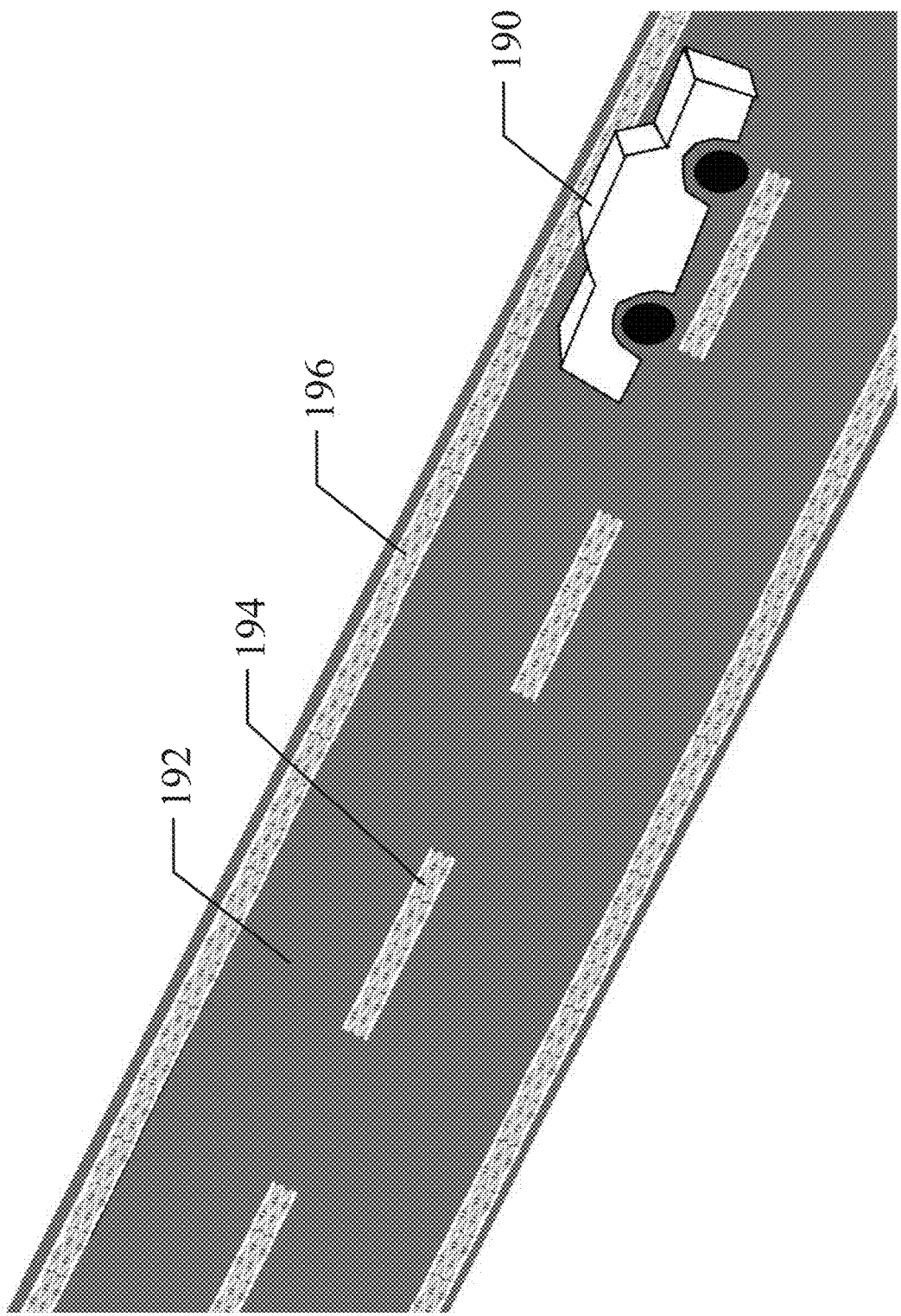
FIG. 12 illustrates a roadway having pavement markings applied by the vehicle of FIG. 11, according to an embodiment.

FIG. 12 illustrates embodiments for a vehicle 190 traversing a roadway 192 equipped with pavement markings that include a longitudinal skip line 194 and a longitudinal edge line 196. In embodiments, the longitudinal pavement markings are installed with a binder material affixed to the roadway 192 and a reflective mesh affixed to and embedded in the binder. In embodiments, the reflectors that are built into the mesh are highly directional and oriented in two longitudinal directions, thus providing superior reflective properties to vehicles 190 traveling the roadway 192 in the shown direction and in the direction parallel to and opposite the shown direction.

Longitudinal pavement markings are designed and installed to provide reflective performance at entrance angles that approach 90 degrees. For reflective elements with a flat top surface, the orientation of the normal angle of the surface will determine how well the flat-surfaced elements perform. It is desirable to have a reflective mesh whereby the normal angles for top surfaces are tilted slightly toward the incident radiation, thus ensuring adequate entry of the incident rays into the reflector and ensuring proper three-surface reflectivity throughout the cube corner construct.

In embodiments, longitudinal skip lines 194 or longitudinal edge lines 196 can be embedded into the surface of roadway 192 at a depth, by grinding away roadway 192 corresponding to the contours of those lines. As such, the potential for damage from plows or other abrasion, grinding, or peeling can be reduced. In some embodiments, a mesh of retroreflective reflectors can be embedded relatively deeply within the lines (194, 196) such that surface abrasion does not cause loss of retroreflectivity. One advantage of a mesh of retroreflectors is that they may be less easily mechanically removed from the rest of the mesh superstructure than, for example, loose retroreflective beads.

Figure 13B:
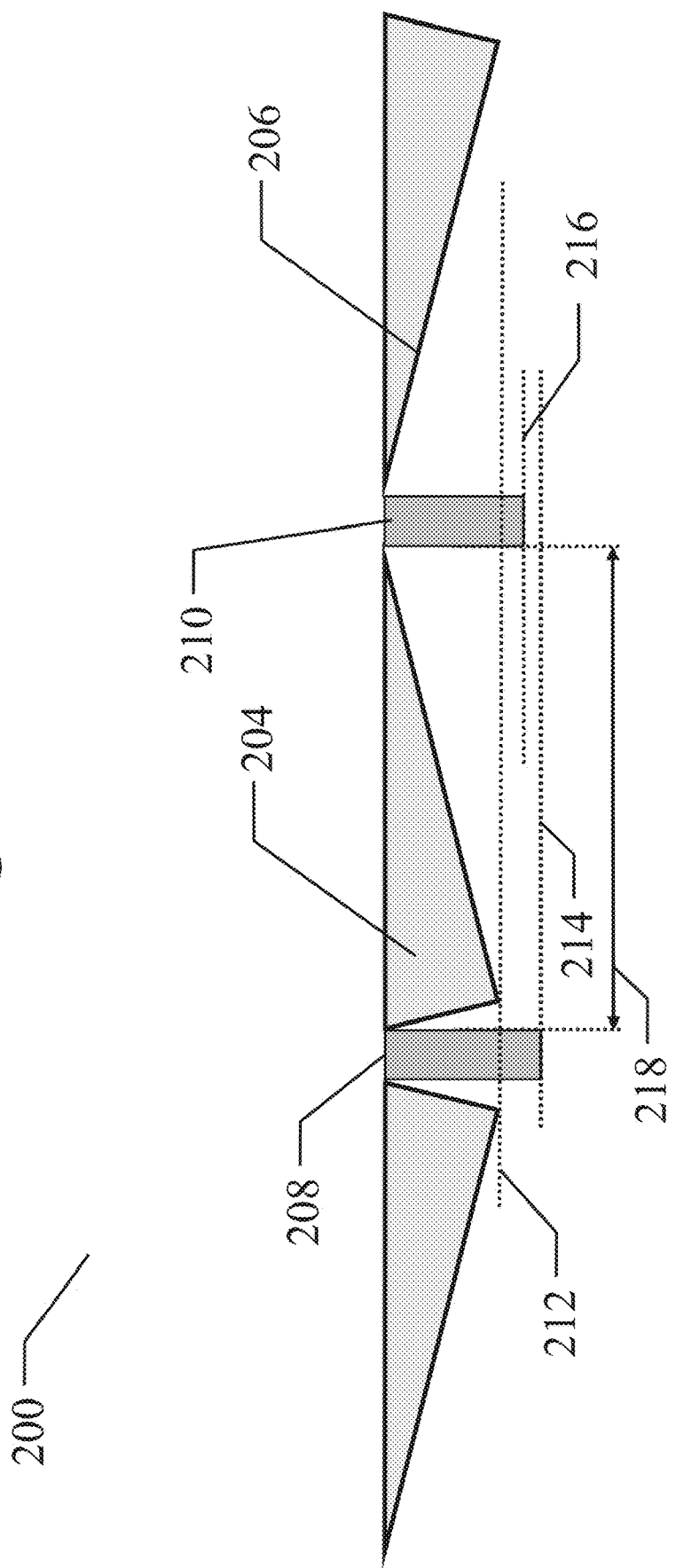

FIGS. 13A and 13B illustrate a top view and a side view, respectively, of a bi-directional, longitudinal reflective mesh 200 for use in a normal-angle-controlling configuration. In embodiments, the interconnected highly-directional reflectors 204, 206 are arranged into the mesh 200 that also includes interconnecting components organized to provide highly directional reflectivity for longitudinal pavement markings at entrance angles consistent with bi-directional vehicle traffic in two opposing directions. In embodiments, all reflectors within a transverse section will have highly-directional incident angles that are parallel to and in substantially the same direction as one another, within manufacturing tolerances. Reflector 204 represents elements in a transverse section whereby highly-directional reflectivity will occur for incident rays from the right, as shown, and reflector 206 represents elements in a transverse section whereby highly-directional reflectivity will occur for incident rays from the left, as shown. In embodiments, in order to influence the tilting of reflectors 204, 206 toward incident radiation, high-side mesh standoff 208 elements and low-side mesh standoff elements 210 are utilized to situate the top surface of reflectors 204, 206 at a known height above a roadway and with a non-vertical normal angle. In embodiments, a high-side standoff 208 height 214 is typically equal to the binder thickness to which the mesh is affixed and into which the high-side standoff 208 is embedded. In embodiments, a high-side standoff 208 height 214 and a low-side standoff 210 height 216 are greater than or equal to a maximum vertical dimension 212 of a reflector 204, 206. In embodiments, a high-side standoff 208 height 214 is greater than a low-side standoff 210 height 216 and, whereby a known distance 218 between standoffs 208, 210 defines the angle at which the normal to the top surface of a reflector 204, 206 will deviate from vertical and is computed according to:

$$\theta_N = \tan^{-1}(h_{high\text{-}side} - h_{low\text{-}side})/d \qquad \text{Eq. 7}$$

where
$\theta_N$ is the normal angle for the top surface of a reflector, with 0° degrees defined as vertical,
$h_{high\text{-}side}$ is the height of a high-side standoff,
blow-side is the height of a low-side standoff, and
d is the distance between the edges of a high-side standoff and a low-side standoff.

In embodiments, reflective mesh is installed in situ into a binder layer for field-installed pavement markings or is installed in a factory into a binder or adhesive layer for reflective tape products. In embodiments, factory-installed or field-installed reflective mesh procedures utilize a vertical pressure step to determine the orientation of the normal angles for the individual reflectors. FIG. 14A illustrates a pavement marking construction 230 before application of a vertical pressure step, and FIG. 14B depicts the same pavement marking construction 231 after the application of a vertical pressure step. In embodiments, a reflective mesh is affixed to and installed into an uncured, partially-cured, molten, or semi-molten binder 220, the mesh including a right-facing reflector 222, a left-facing reflector 224, a high-side standoff 226, and a low-side standoff 228. A high-side standoff 226 is shown before 230 pressure application with a bottom surface abutting a roadway surface 232. The standoffs 226 and 228 extend primarily perpendicularly to the roadway (i.e., along a primary axis parallel to the normal axes of the plurality of reflectors 222). A low-side standoff 228 is shown before 230 pressure application with a bottom surface that is not abutting a roadway surface 232. In embodiments, a low-side standoff 229 is shown after 231 pressure application with a bottom surface that is abutting a roadway surface 232. Upon pressure application, a right-facing reflector has a normal angle 238 that varies from vertical 234 by an amount determined by Eq. 7. Upon pressure application, a left-facing reflector has a normal angle 239 that varies from vertical 236 by an amount determined by Eq. 7.

Figure 15:
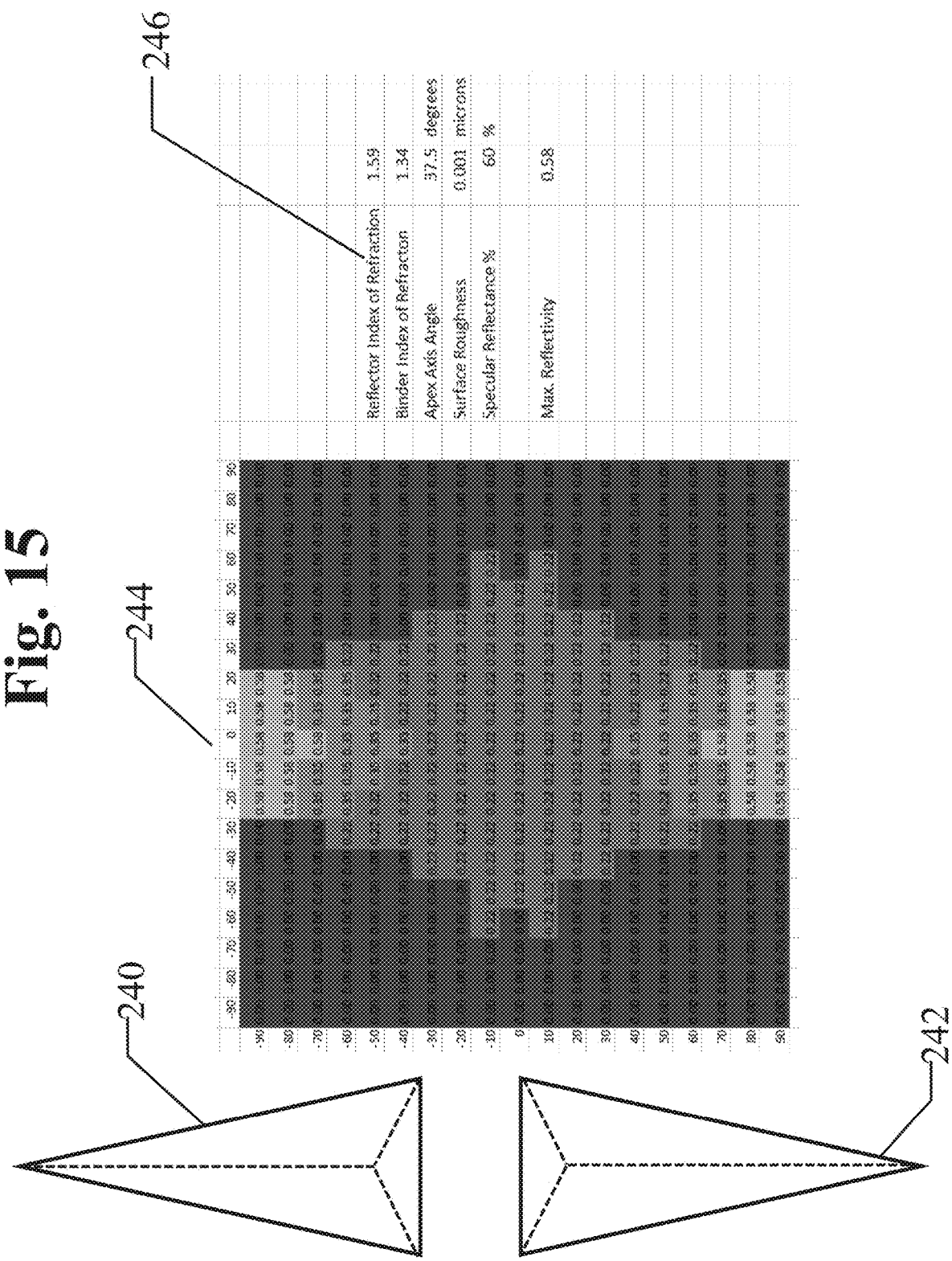
FIG. 15 illustrates a radiance model intensity plot for a reflective mesh produced with highly-directional reflective elements oriented along a longitudinal axis in opposite directions, according to an embodiment.

FIG. 15 illustrates a radiance model intensity plot 244 for a reflective mesh produced with highly-directional reflective elements 240, 242 oriented along a longitudinal axis in opposite directions with parameter table values as shown below:

| | |
|---|---|
| Reflector Index of Refraction | 1.59 |
| Binder Index of Refraction | 1.34 |
| Apex Axis Angle | 37.5 degrees |
| Surface Roughness | 0.001 microns |
| Specular Reflectance Percentage | 60% |

The intensity plot 244 indicates that for incident rays that exhibit reflection off all three surfaces of a cube corner construct, most of the incident angles in both longitudinal directions produce reflected intensities (indicated by 0.22 values) due to specular reflection off all three surfaces. In embodiments vertical (or longitudinal) entrance angles in the range of 80-90 degrees will exhibit TIR for both of the side surfaces, indicated by 0.58 reflected intensity values, for horizontal (or lateral) entrance angles from −20 degrees to +20 degrees.

In the United States, for example, binder thicknesses for pavement marking will typically be 0.012 inches to 0.025 inches for paint and epoxy and 0.040 inches to 0.1 inches for thermoplastic or methyl methacrylate. In embodiments, reflective mesh products may be provided with standoffs at a set of different standard heights to accommodate different ranges of binder thicknesses. In embodiments, a reflective mesh is produced whereby tilting of reflector normal angles from vertical is achieved during mesh manufacturing. In embodiments, for a factory-tilted reflective mesh, standoff heights are smaller than the maximum vertical dimension of a reflector.

Figure 16:
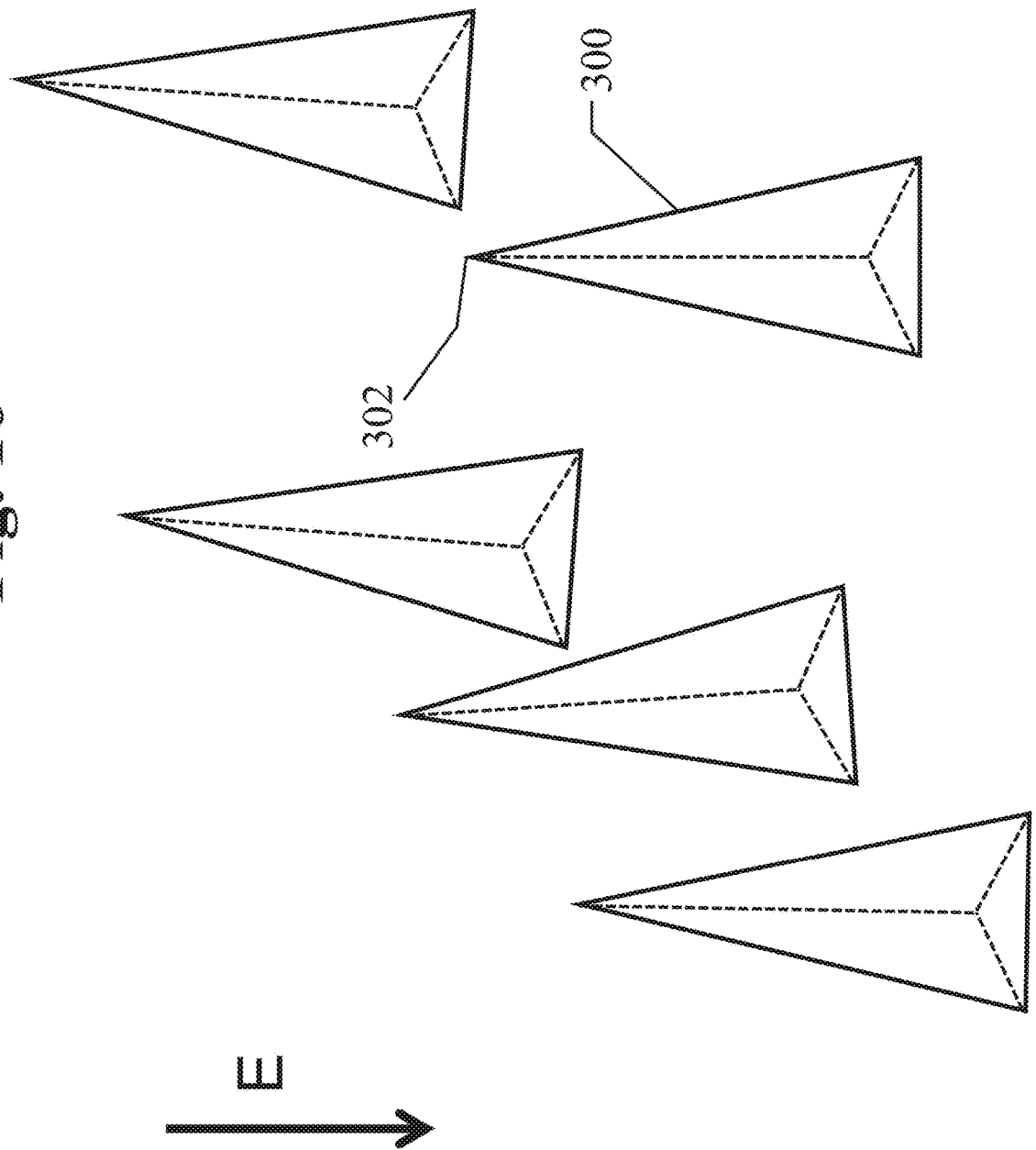
FIG. 16 illustrates a plurality of elements arranged along an electromagnetic field, according to an embodiment.

In other embodiments, a mesh need not be required in order to align reflectors to create an anisotropic effect. By removing interstitial components, the complexity and materials requirements to manufacture such embodiments can be decreased. In one embodiment, reflectors can be aligned by statically charging the reflective elements 300, as shown in FIG. 16, and then placing them within an electromagnetic field E. Because static charge will primarily gather at the tip 302 thereof, each of the reflectors 300 can function essentially as a small compass and self-align due to the force applied by the electric field upon each reflector 300.

Figure 17:
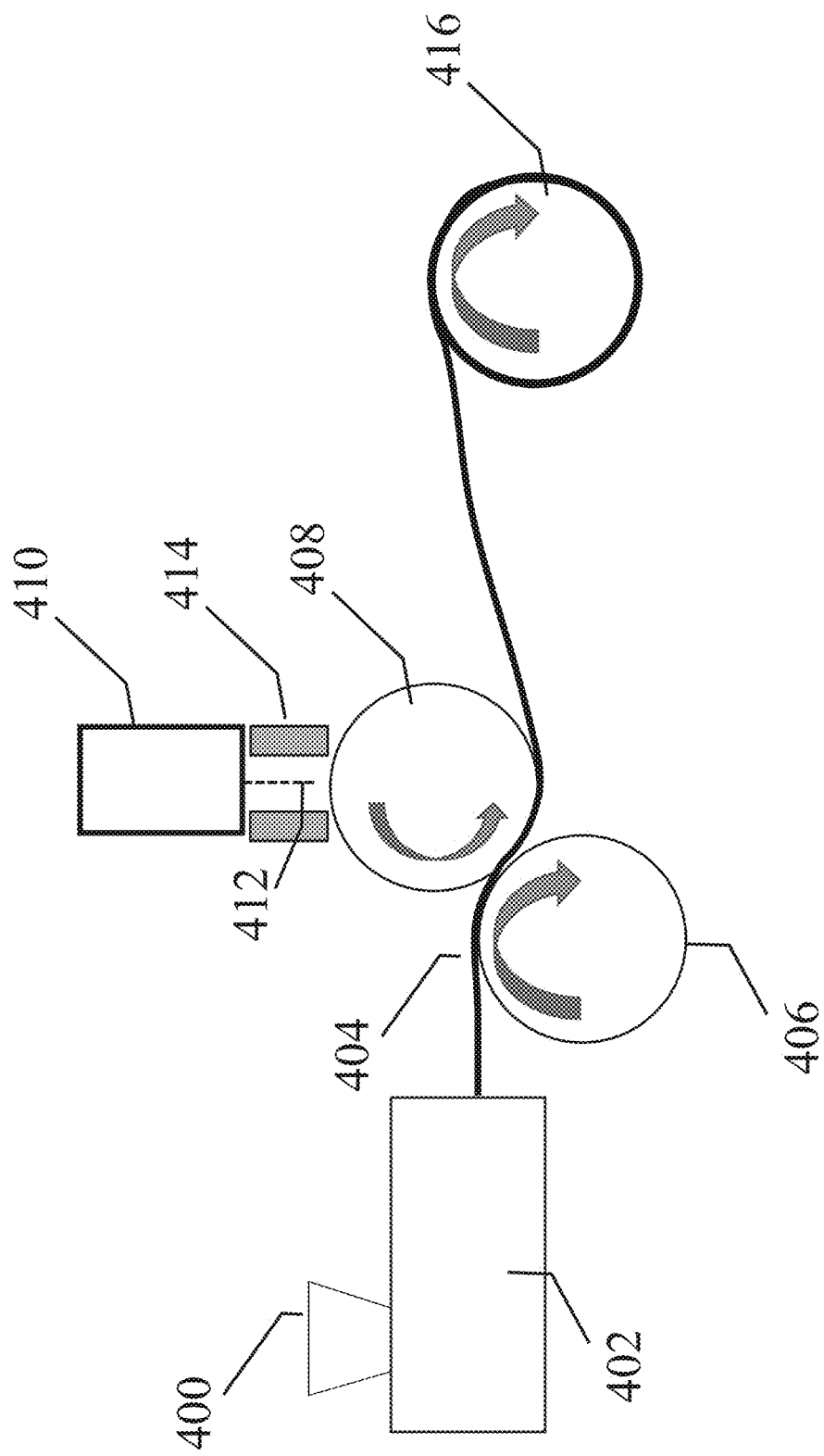
FIG. 17 depicts a process line for making an anisotropic retroreflective material according to an embodiment.

FIG. 17 shows a processing line configured to generate retroreflective, anisotropic tapes or other materials that include trihedral materials as described herein. As shown in FIG. 17, a hopper 400 feeds a die 402, which extrudes a web 404. The web 404 can be made of a binder material such as those described above with respect to other embodiments. The extruded web 404 is transferred to nip rollers 406 and 408. Nip rollers 406 and 408 can provide a uniform thickness of the web 404. Additionally, nip rollers can be used to provide a desired texture, by embossing either or both of the nip rollers (406, 408) with a negative of a desired profile.

In the embodiment shown in FIG. 17, nip roller 408 is further used to deliver trihedral retroreflectors at a surface portion of the web 404. As shown in FIG. 17, a reflector maker 410 is arranged proximate to nip roller 408, and is configured to provide reflectors 412, shown falling towards nip roller 408. Reflectors 412 fall between two plates 414, which generate an electromagnetic field to orient them en route to the nip roller 408. In embodiments, as described with respect to FIG. 16, each of the reflectors 412 can be statically charged in order to be aligned in this way. Nip roller 408 can hold the aligned reflectors 412 by static electrical force, in one embodiment, or nip roller 408 could be made or a naturally tacky material such as polydimethylsiloxane (PDMA) or similar that holds the oriented reflectors 412 due to Van der Waals interactions. In either case, nip roller 408 holds reflectors 412 and impresses them into web 404, which is then collected at roller 416.

The simplified process line shown in FIG. 17 could include other components, in alternative embodiments. For example, while FIG. 17 only shows embedding reflectors 412 oriented in one direction (i.e., unidirectional anisotropy) it may be desirable to have reflectors 412 that point in opposite directions, as described with respect to other embodiments. This could be accomplished either by providing reflectors 412 that have opposite charges from one another, or alternatively a second reflector maker 410 could be used to provide reflectors that are oriented in the opposite direction. A second reflector maker 410 could use an additional nip roller (not shown).

Reflector maker 410 can be a shaker to dispense pre-made reflectors, or it could form the reflectors during processing, in embodiments. In some embodiments, the reflectors can be shaped by exposure to radiation en route to the nip roller, as described in U.S. Pat. No. 8,513,322 which describes the use of nip rollers for the creation of spherical beads.

In still further embodiments, nip rollers 406 and 408 can "pinch" the web 404 to create voids corresponding to a desired mesh pattern. A sprayer could then be used to apply material having the desired index of refraction for the anisotropic retroreflectors. Alternatively, pre-formed trihedral reflectors could be placed on top of the web having the negative of the mesh pattern and reflectors could be inserted therein mechanically.

The process line shown in FIG. 17 could also be modified to include a source of opaque material described with respect to FIG. 8. For example, before web 404 reaches nip rollers 406 and 408, a sprayer or roller could apply the opaque material such that it is present on the surface that will be impregnated with reflectors 412.

In still further embodiments, a mesh of anisotropic retroreflectors could be draped over nip roller 408 to be pressed into web 404, using a roll-to-roll process.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. An anisotropic retroreflective mesh for pavement markings comprising:
a plurality of reflectors each made of a material having a first refractive index, each of the plurality of reflectors including:
a top surface defining a normal axis perpendicular thereto;
a bottom right side surface, a bottom left side surface, and an end surface all arranged orthogonally to one another;
the bottom right side surface, the bottom left side surface, and the end surface defining an apex axis along which the bottom right side surface, the bottom left side surface, and the end surface are equiangular,
wherein an angle between the normal axis and the apex axis of each reflector is non-zero, and
wherein the plurality of reflectors are arranged in a pattern defining the anisotropic retroreflective mesh such that each of the normal axes of the plurality of reflectors is substantially parallel to one another; and
a binder material at least partially surrounding the plurality of reflectors such that the binder is arranged adjacent to each of the bottom right side surface, the bottom left side surface, and the end surface of each of the plurality of reflectors, the binder having a second refractive index that is different from the first refractive index.

2. The anisotropic retroreflective mesh of claim 1, wherein the angle between the normal axis and the apex axis of each of the plurality of reflectors is between about 4.0 degrees and about 30 degrees.

3. The anisotropic retroreflective mesh of claim 1, wherein the first refractive index of the material of each of the plurality of reflectors is greater than 2.2.

4. The anisotropic retroreflective mesh of claim 1, wherein the binder is a flowable material selected from the set of: a polymeric material, a thermoplastic material, a thermoset material, or a paint.

5. The anisotropic retroreflective mesh of claim 1, wherein the mesh comprises a plurality of mesh standoff elements arranged such that an air gap is arranged between each set of two of the plurality of reflectors.

6. The anisotropic retroreflective mesh of claim 1, wherein the mesh comprises a net of interstitial connectors.

7. The anisotropic retroreflective mesh of claim 1, wherein the mesh comprises a matrix of a plurality of standoffs extending along a primary axis parallel to the normal axes of the plurality of reflectors.

8. The anisotropic retroreflective mesh of claim 1, wherein the mesh comprises a pattern defined on a roller that positions the plurality of reflectors in the binder material.

9. The anisotropic retroreflective mesh of claim 1, wherein the pattern defining the anisotropic retroreflective mesh includes:
approximately half of the plurality of reflectors oriented with the end surfaces thereof pointing in a first direction, and
approximately half of the plurality of reflectors oriented with the end surfaces thereof pointing in a second direction that is diametrically opposed to the first direction.

10. A process of producing an anisotropic retroreflective mesh for pavement markings comprising:
providing a plurality of reflectors each of the plurality of reflectors including:
a top surface defining a normal axis perpendicular thereto;
a bottom right side surface, a bottom left side surface, and an end surface all arranged orthogonally to one another;
the bottom right side surface, the bottom left side surface, and the end surface defining an apex axis along which the bottom right side surface, the bottom left side surface, and the end surface are equiangular, wherein an angle between the normal axis and the apex axis is non-zero;
co-orienting the plurality of reflectors in a mesh having a pattern in which each of the normal axes of the plurality of reflectors is substantially parallel to one another; and
combining a binder material and the mesh of the plurality of reflectors such that the top surfaces of the plurality of reflectors are exposed while the bottom right side surfaces, the bottom left side surfaces, and the end surfaces of the plurality of reflectors are arranged in contact with the binder material.

11. The process of claim 10, wherein the binder material has a first index of refraction and the plurality of reflectors have a second index of refraction that is different from the first index of refraction.

12. The process of claim 10, wherein the co-orienting the plurality of reflectors in the mesh includes:
orienting approximately half of the plurality of reflectors with the end surfaces thereof pointing in a first direction, and
orienting approximately half of the plurality of reflectors with the end surfaces thereof pointing in a second direction that is diametrically opposed to the first direction.

13. The process of claim 10, wherein co-orienting the plurality of reflectors comprises:
applying a static charge to the plurality of reflectors; and exposing the reflectors to an electromagnetic field.

14. The process of claim 10, wherein forming the web of the binder material comprises extruding a polymer.

15. The process of claim 10, wherein forming the web of the binder material comprises applying a paint to a surface.

16. The process of claim 10, further comprising applying the combined web and plurality of reflectors to a roadway.

17. The process of claim 16, further comprising applying a pressure treatment to the combined web and plurality of reflectors after applying to the roadway.

* * * * *